US012598554B2

(12) United States Patent
Noh et al.

(10) Patent No.:  US 12,598,554 B2
(45) Date of Patent:       Apr. 7, 2026

(54) METHOD AND APPARATUS FOR ADJUSTING MAXIMUM UPLINK TRANSMISSION POWER IN WIRELESS COMMUNICATION SYSTEM

(71) Applicant: Samsung Electronics Co., Ltd., Suwon-si (KR)

(72) Inventors: Hoondong Noh, Suwon-si (KR); Hyoungju Ji, Suwon-si (KR); Younsun Kim, Suwon-si (KR); Jinhyun Park, Suwon-si (KR); Heecheol Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 440 days.

(21) Appl. No.: 18/057,865

(22) Filed:       Nov. 22, 2022

(65) Prior Publication Data

US 2023/0086214 A1       Mar. 23, 2023

Related U.S. Application Data

(63) Continuation of application No. 16/832,926, filed on Mar. 27, 2020, now Pat. No. 11,516,744.

(30) Foreign Application Priority Data

Mar. 29, 2019    (KR) ........................ 10-2019-0037019

(51) Int. Cl.
  *H04W 52/14*         (2009.01)
  *H04B 7/0456*        (2017.01)
        (Continued)
(52) U.S. Cl.
  CPC ........ *H04W 52/146* (2013.01); *H04B 7/0456* (2013.01); *H04B 7/0617* (2013.01); *H04W 16/28* (2013.01); *H04W 64/003* (2013.01)

(58) Field of Classification Search
  CPC . H04W 52/146; H04W 16/28; H04W 64/003; H04W 52/28; H04W 52/42;
        (Continued)

(56) References Cited

U.S. PATENT DOCUMENTS

| | | |
|---|---|---|
| 2011/0051835 A1 | 3/2011 | Yuan et al. |
| 2012/0207112 A1* | 8/2012 | Kim .................... H04W 52/545 |
| | | 370/328 |

(Continued)

FOREIGN PATENT DOCUMENTS

| | | |
|---|---|---|
| WO | 2017/078475 A1 | 5/2017 |
| WO | 2017/196612 A1 | 11/2017 |

(Continued)

OTHER PUBLICATIONS

Qualcomm Incorporated, "Rel-16 RF Exposure compliance mitigation techniques," R4-1900448, 3GPP TSG-RAN WG4 Meeting #90, Athens, Greece, Feb. 25-Mar. 1, 2019, 4 pages.

(Continued)

*Primary Examiner* — Ricky Q Ngo
*Assistant Examiner* — Kabir U Jahangir

(57)                    ABSTRACT

The present disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method of a terminal in a communication system comprises transmitting, to a base station, an uplink transmission subset restriction (UL-TxSR) request, based on a predetermined condition related to uplink transmission power, receiving, (Continued)

from the base station, a response corresponding to the UL-TxSR request; and transmitting, to the base station, an uplink signal based on the UL-TxSR.

16 Claims, 17 Drawing Sheets

(51) Int. Cl.
*H04B 7/06* (2006.01)
*H04W 16/28* (2009.01)
*H04W 64/00* (2009.01)

(58) Field of Classification Search
CPC .. H04B 7/0456; H04B 7/0617; H04B 7/0465; H04B 7/0695; H04B 7/0404; Y02D 30/70
See application file for complete search history.

(56) References Cited

U.S. PATENT DOCUMENTS

| | | | |
|---|---|---|---|
| 2013/0225228 A1* | 8/2013 | Park | H04W 52/243 |
| | | | 455/522 |
| 2014/0200003 A1 | 7/2014 | Kodali et al. | |
| 2015/0111608 A1* | 4/2015 | Kazmi | H04W 52/367 |
| | | | 455/522 |
| 2018/0084564 A1 | 3/2018 | Xu et al. | |
| 2018/0132197 A1 | 5/2018 | Lin et al. | |
| 2018/0176949 A1 | 6/2018 | Islam et al. | |
| 2018/0262998 A1 | 9/2018 | Park et al. | |
| 2018/0278318 A1 | 9/2018 | Chakraborty et al. | |
| 2018/0359014 A1 | 12/2018 | Noh et al. | |
| 2019/0104476 A1* | 4/2019 | Lim | H04W 52/146 |
| 2020/0100194 A1* | 3/2020 | Nangia | H04L 5/005 |
| 2020/0145927 A1* | 5/2020 | Sun | H04W 52/146 |
| 2020/0214042 A1 | 7/2020 | Nagaraja et al. | |
| 2022/0070794 A1* | 3/2022 | Lim | H04B 1/3838 |
| 2022/0124627 A1* | 4/2022 | Oguma | H04W 52/267 |

FOREIGN PATENT DOCUMENTS

| | | |
|---|---|---|
| WO | 2019/011271 A1 | 1/2019 |
| WO | 2019/036940 A1 | 2/2019 |
| WO | 2020/221506 A1 | 11/2020 |

OTHER PUBLICATIONS

RAN4, "[Draft] LS on FR2 RF Exposure mitigation methods," R4-1902193, 3GPP TSG-RAN WG4 Meeting #90, Athens, Greece, Feb. 25-Mar. 1, 2019, 1 page.

International Search Report and Written Opinion of the International Searching Authority in connection with International Application No. PCT/KR2020/004313 dated Jul. 2, 2020, 7 pages.

Intel Corporation, "Open issues for RF exposure compliance in FR2," R4-1901968, 3GPP TSG RAN4 WG Meeting #90, Athens, Greece, Feb. 25-Mar. 1, 2019, 3 pages.

LG Electronics, "Required P-MPR/UL dutycycle restriction for MPE regulations at FR2," R4-1900252, 3GPP TSG RAN4 WG Meeting #90, Athens, Greece, Feb. 25-Mar. 1, 2019, 5 pages.

OPPO, "Discussion on the MPE (Maximum Permissible Exposure) issue," R1-1900296, 3GPP TSG RAN WG1 Ad-Hoc Meeting #1901, Taipei, Jan. 21-25, 2019, 5 pages.

Supplementary European Search Report dated Mar. 29, 2022, in connection with European Application No. 20782121.6, 12 pages.

Nokia et al., "FR2 UE RF exposure compliance and its system implications", 3GPP TSG-RAN WG4 Meeting #89, Nov. 12-16, 2018, R4-1814862, 4 pages.

Intel Corporation, "On power control for FR2", 3GPP TSG-RAN WG4 Meeting #84bis, Oct. 9-13, 2017, R4-1710381, 5 pages.

European Search Report dated Dec. 14, 2022 in connection with European Patent Application No. 22 19 7348, 13 pages.

Communication pursuant to Article 94(3) EPC dated Mar. 19, 2025 in connection to European application No. 22197348.0, 9 pages.

Office Action dated May 16, 2025 in connection to Korean application No. 10-2019-0037019, 9 pages.

* cited by examiner 10-05

Up to 30% duty cycle in practical deployments

Time

100% duty cycle in specifications 10-00

METHOD AND APPARATUS FOR ADJUSTING MAXIMUM UPLINK TRANSMISSION POWER IN WIRELESS COMMUNICATION SYSTEM

CROSS-REFERENCE TO RELATED APPLICATION

This application is a continuation of U.S. patent application Ser. No. 16/832,926 filed on Mar. 27, 2020, which is based on and claims priority under 35 U.S.C. 119 to Korean Patent Application No. 10-2019-0037019 filed on Mar. 29, 2019, in the Korean Intellectual Property Office, the disclosures of which are herein incorporated by reference in their entirety.

BACKGROUND

1. Field

The disclosure relates to a wireless communication system and, more particularly, to a method and an apparatus for adjusting uplink transmission power or transmission direction.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the US FCC restricts the power absorbed into the human body when a wireless terminal transmits radio waves under the maximum permissible RF exposure (MPE) regulation. The amount of absorption of radio waves into the human body from the wireless terminal is usually increased in proportion to frequency, and harmfulness of radio wave absorption often becomes higher because users use the wireless terminal in the state in which the wireless terminal is very close to the human body at a distance of 20 cm or less. LTE and NR systems provide two methods: 1) power management maximum power reduction (P-MPR), which enables the terminal to adjust the maximum uplink transmission power in consideration of the MPE regulation; and 2) a UL duty cycle, which enables the terminal to adjust an uplink transmission ratio, thereby controlling the amount of radio wave absorption into the human body for a unit time. Meanwhile, if only the two methods above are used in the band of 6 GHz or more (FR2, frequency range 2), a high P-MPR up to 10 dB or more is required, or a low UL duty cycle of less than 5% is used, which significantly lowers the uplink transmission power, thereby causing a serious problem with uplink coverage degradation.

The above information is presented as background information only to assist with an understanding of the disclosure. No determination has been made, and no assertion is made, as to whether any of the above might be applicable as prior art with regard to the disclosure.

SUMMARY

Based on the above discussion, the disclosure has an objective to provide a method and an apparatus for adjusting maximum uplink transmission power and transmission direction (beam direction) in consideration of the amount of human body absorption of radio waves in a wireless communication system.

In accordance with an aspect of the disclosure, a method of a terminal is provided. The method includes transmitting, to a base station, an uplink transmission subset restriction (UL-TxSR) request, based on a predetermined condition related to uplink transmission power, receiving, from the base station, a response corresponding to the UL-TxSR request, and transmitting, to the base station, an uplink signal based on the UL-TxSR.

In accordance with another aspect of the disclosure, a method of a base station is provided. The method includes receiving, from a terminal, an uplink transmission subset restriction (UL-TxSR) request, based on a predetermined condition related to uplink transmission power, transmitting, to the terminal, a response corresponding to the UL-TxSR request, and receiving, from the terminal, an uplink signal based on the UL-TxSR.

In accordance with another aspect of the disclosure, a terminal is provided. The terminal includes a transceiver and a controller configured to transmit, to a base station via the transceiver, an uplink transmission subset restriction (UL-TxSR) request, based on a predetermined condition related to uplink transmission power, receive, from the base station via the transceiver, a response corresponding to the UL-TxSR request, and transmit, to the base station via the transceiver, an uplink signal based on the UL-TxSR.

In accordance with another aspect of the disclosure, a base station is provided. The base station includes a transceiver and a controller configured to receive, from a terminal via the transceiver, an uplink transmission subset restriction (UL-TxSR) request, based on a predetermined condition related to uplink transmission power, transmit, to the terminal via the transceiver, a response corresponding to the UL-TxSR request, and receive, from the terminal via the transceiver, an uplink signal based on the UL-TxSR.

According to an embodiment, it is possible to reduce the impact on uplink coverage or performance while satisfying the MPE regulation for the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
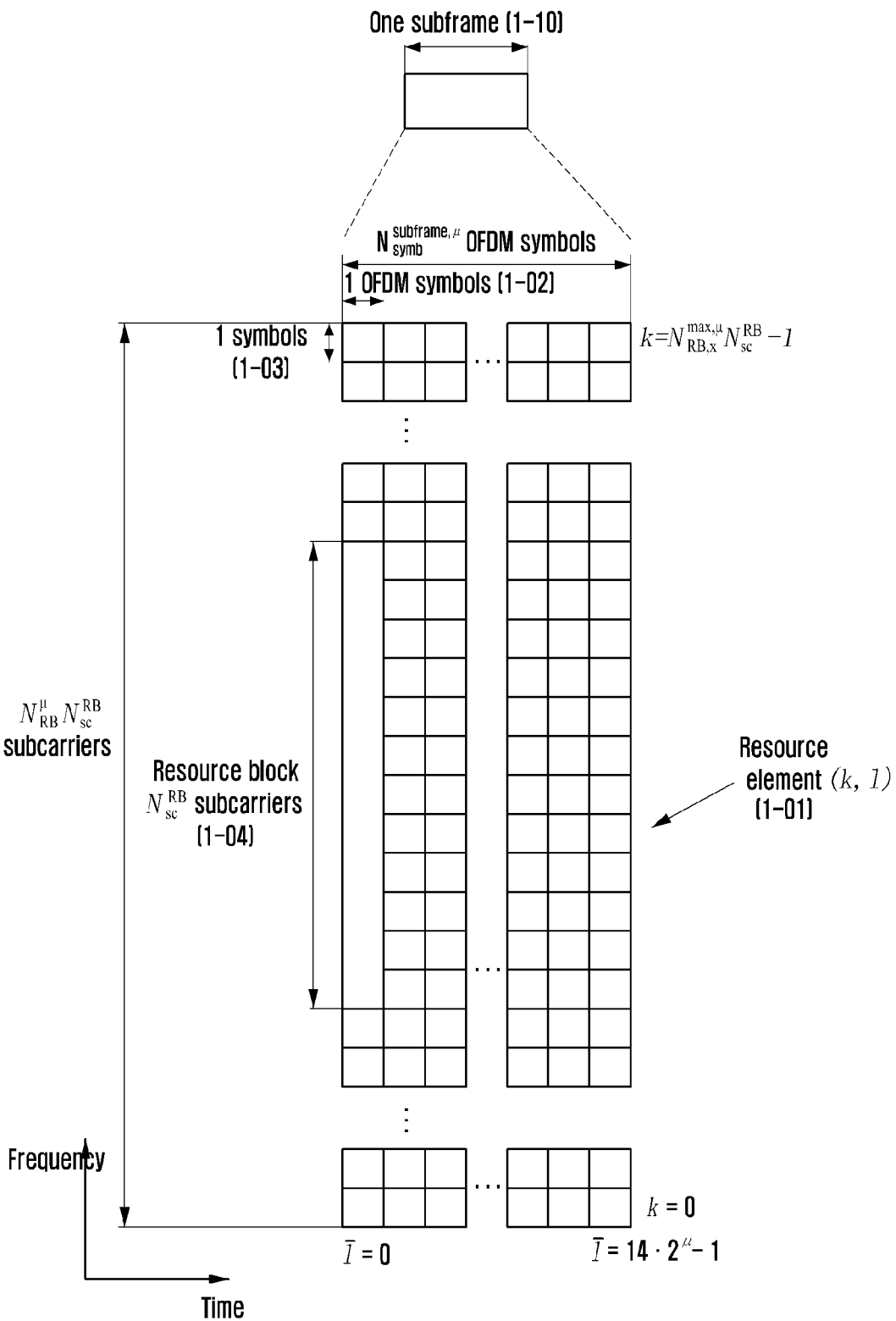
FIG. 1 illustrates a diagram of a time-frequency domain transmission structure in LTE {long-term evolution or evolved universal terrestrial radio access (E-UTRA)}, LTE-Advanced (LTE-A), NR, or a wireless communication system similar thereto.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, the base station is an entity for performing resource allocation to the terminal, and may be at least one of a gNode B, an eNode B, a Node B, a base station (BS), a wireless access unit, a base station controller, or a node in a network. The terminal may include a user equipment (UE), a mobile station (MS), a cellular phone, a smartphone, a computer, or a multimedia system capable of performing communication functions. The base station and the terminal are not limited to the above examples. Hereinafter, the disclosure describes a technique for a terminal to receive broadcast information from a base station in a wireless communication system. The disclosure relates to a communication technique for merging, with IoT (Internet of Things) technology, a 5G (5th generation) communication system for supporting a higher data rate, subsequent to a 4G (4th generation) system, and a system thereof. The disclosure may be applied to an intelligent service (for example, smart home, smart building, smart city, smart car or connected car, healthcare, digital education, retail, security and safety-related services, and the like), based on a 5G communication technology and an IoT-related technology.

In the following description, terms referring to broadcast information, terms referring to control information, terms referring to communication coverage, terms referring to a change in the state (e.g., event), terms referring to network entities, terms referring to messages, terms referring to elements of a device, and the like are illustrative words for the convenience of explanation. Accordingly, the disclosure is not limited to the terms described below, and other terms having equivalent technical meanings may be used.

Hereinafter, terms and names defined in the 3rd-generation partnership project long-term evolution (3GPP LTE) standard will be used for the convenience of explanation. However, the disclosure is not limited to the above terms and names, and may be applied to systems conforming to other standards in the same manner.

The wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link through which the terminal {user equipment (UE) or mobile station (MS)} transmits data or control signals to the base station (BS) (eNode B), and downlink refers to a radio link through which the base station transmits data or control signals to the terminal. The above multiple access scheme separates data or control information of the respective users by allocating and operating time-frequency resources to transmit the data or control information for each user so as to avoid overlapping each other (that is, so as to establish orthogonality).

Since a 5G communication system, which is a communication system subsequent to LTE, must freely reflect various requirements of users, service providers, and the like, services satisfying various requirements must be supported. The services considered for the 5G communication system include enhanced mobile broadband (eMBB) communication, massive machine-type communication (mMTC), ultra-reliability low-latency communication (URLLC), and the like.

According to some embodiments, the eMBB aims at providing a data rate higher than that supported by existing LTE, LTE-A, or LTE-Pro. For example, in the 5G communication system, the eMBB must provide a peak data rate of 20 Gbps in the downlink and a peak data rate of 10 Gbps in the uplink for a single base station. Furthermore, the eMBB must provide an increased user perceived data rate to the terminal. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of the band of 2 GHz used in the current LTE.

In addition, mMTC is being considered to support application services such as the Internet of Things (IoT) in the 5G system. The mMTC has requirements, such as support of connection of large numbers of terminals in the cell, enhancement of the terminal coverage, improved battery time, and a reduction in the cost of a terminal, in order to effectively provide the Internet of Things. Since the Internet of Things provides communication functions while being provided to various sensors and various devices, it must support a large number of terminals (e.g., 1,000,000 terminals/km²) in the cell. In addition, the terminals supporting the mMTC may require wider coverage than those of other services provided by the 5G communication system because the terminals are likely to be located in a shadow area, such as a basement of a building, which is not covered by a cell due to the nature of the service. The terminals supporting the mMTC is required to be configured to be inexpensive, and may require a very long battery life time because it is difficult to frequently replace the battery of the terminal.

Lastly, the URLLC, which is a cellular-based mission-critical wireless communication service, is used for remote control for robots or machines, industrial automation, unmanned aerial vehicles, remote health care, emergency alert, or the like, and must provide communication with ultra-low latency and ultra-reliability. For example, a service supporting the URLLC must satisfy an air interface latency of less than 0.5 ms, and also requires a packet error rate of 10-5 or less. Therefore, for the services supporting the URLLC, the 5G system must provide a transmit time interval (TTI) shorter than those of other services, and also requires a design for allocating large amount of resources in the frequency band. However, the above-mentioned mMTC, URLLC, and eMBB are only examples of different types of services, and the disclosure is not limited to the types of services described above.

The above-mentioned services considered in the 5G communication system must converge to a single framework to then be provided. That is, the respective services are preferably integrated into a single system to then be controlled and transmitted, instead of operating the services independently, for efficient resource management and control.

In addition, although the embodiments of the disclosure will be described below by way of example as LTE, LTE-A, LTE-Pro, or NR systems, the embodiments of the disclosure are able to be applied to other communication systems having similar technical backgrounds or channel forms. Further, the embodiments of the disclosure are able to be applied to other communication systems through some modifications thereof without departing from the scope of the disclosure according to judgment by those skilled in the art.

The disclosure relates to a method and an apparatus for repeatedly transmitting data and control signals between a plurality of transmission nodes and terminals performing cooperative communication to improve communication reliability.

According to the disclosure, in the case where network cooperative communication is used in a wireless communication system, the reliability of data/control signals received by the terminal is able to be improved.

Hereinafter, a frame structure of a 5G system will be described in more detail with reference to the accompanying drawings. FIG. 1 illustrates a diagram of the time-frequency domain transmission structure of LTE, LTE-A, NR, or wireless communication systems similar thereto.

FIG. 1 shows a basic structure of a time-frequency domain that is a wireless resource domain for transmitting data or control channels in a 5G system.

Figure 2:
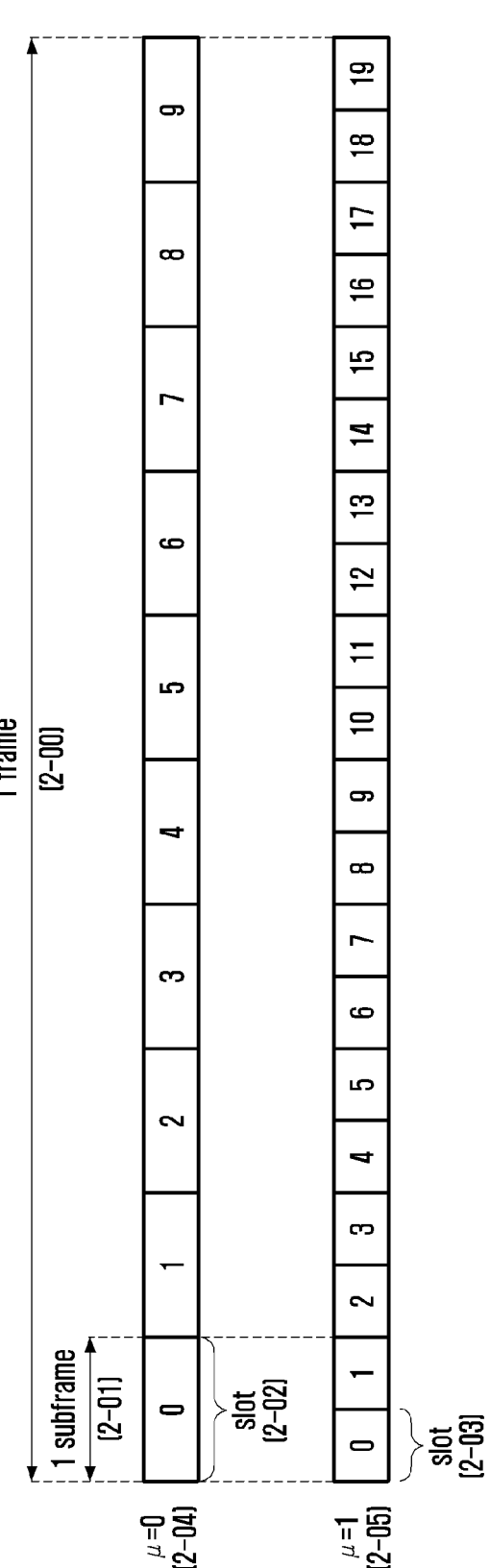
FIG. 2 illustrates a diagram of the structure of a frame, a subframe, and a slot in 5G (5th generation)

Referring to FIG. 1, the horizontal axis represents a time domain, and the vertical axis represents a frequency domain. The basic unit of a resource in the time-frequency domain is a resource element (RE) 1-01, which may be defined as one orthogonal frequency division multiplexing (OFDM) symbol 1-02 on the time axis and one subcarrier 1-03 on the frequency axis. Consecutive $N\_sc\^RB$ (e.g., 12) REs may constitute one resource block (RB) 1-04 in the frequency domain. FIG. 2 illustrates a diagram of the structure of a frame, a subframe, and a slot in a 5G system.

FIG. 2 illustrates a diagram of a slot structure considered in a 5G system.

Referring to FIG. 2, FIG. 2 illustrates an example of the structure of a frame 2-00, a subframe 2-01, and a slot 2-02. One frame 2-00 may be defined as 10 ms. One subframe 2-01 may be defined as 1 ms, and thus, one frame 2-00 may include a total of 10 subframes 2-01. One slot 2-02 or 2-03 may be defined as 14 OFDM symbols {that is, the number of symbols per $$\mathrm{slot}\left(N_{symb}^{slot}\right)=14\}.$$

One subframe 2-01 may include one or more slots 2-02 and 2-03, and the number of slots 2-02 and 2-03 for each subframe 2-01 may vary depending on a configuration value u of subcarrier spacing 2-04 or 2-05.

The example in FIG. 2 shows the case of μ=0 (2-04) and the case of μ=1 (2-05) as a configuration value of subcarrier spacing. In the case of μ=0 (2-04), one subframe 2-01 may include one slot 2-02, and in the case of μ=1 (2-05), one subframe 2-01 may include two slots 2-03. That is, the number of slots for each subframe $$\left(N_{slot}^{subframe,\mu}\right)$$

may vary depending on the configuration value u of subcarrier spacing, and the number of slots for each frame $$\left(N_{slot}^{subframe,\mu}\right)$$

may vary according thereto.

$$N_{slot}^{subframe,\mu} \text{ and } N_{slot}^{subframe,\mu}$$

according to each configuration value μ of subcarrier spacing may be defined as shown in Table 1 below.

TABLE 1

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs. Therefore, in the case where a terminal always receives signals through the overall bandwidth of a serving cell, such as LTE, there may be a large amount of power consumption by the terminal, and in order to solve this problem, the base station may configure one or more bandwidth parts (BWPs) for the terminal such that the terminal may change the reception area in the cell.

In NR, the base station may configure an "initial BWP", which is the bandwidth of CORESET #0 {or common search space (CSS)}, for the terminal through an MIB. Thereafter, the base station may configure an initial BWP (first BWP) of the terminal through RRC signaling, and may transmit a notification of one or more pieces of BWP configuration information that may be indicated through downlink control information (DCI) later. Afterwards, the base station may transmit a notification of a BWP ID through DCI, thereby indicating the band to be used by the terminal. If the terminal does not receive the DCI in the currently allocated BWP for a specific period of time or more, the terminal returns to a "default BWP" and attempts to receive the DCI.

Figure 3:
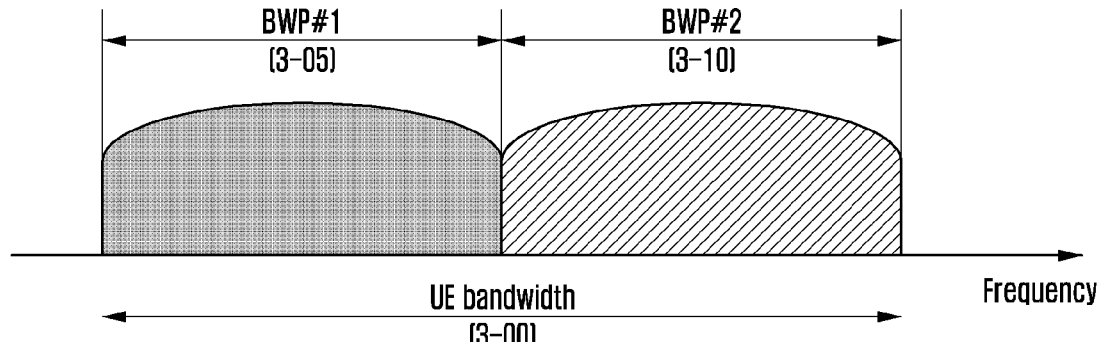
FIG. 3 illustrates an example of configuration of a bandwidth part (BWP) in a wireless communication system according to an embodiment.

FIG. 3 illustrates a diagram of an example of configuration of a bandwidth part in a wireless communication system according to an embodiment.

An example of the configuration of a bandwidth part in a 5G communication system will be described with reference to FIG. 3.

Referring to FIG. 3, FIG. 3 illustrates an example in which a UE bandwidth 3-00 is configured to have two bandwidth parts, that is, bandwidth part #1 (3-05) and bandwidth part #2 (3-10). The base station may configure one or more bandwidth parts for the terminal, and may configure information on each bandwidth part as shown in Table 2 below.

TABLE 2

| Configuration information 1 | Bandwidth of bandwidth part (number of PRBs constituting bandwidth part) |
|---|---|
| Configuration information 2 | Frequency location of bandwidth part (This information may be offset valuecompared to reference point. Reference point may be, for example, center frequency of carrier, synchronization signal, synchronization signal raster, etc.) |
| Configuration information 3 | Numerology of bandwidth part (e.g., subcarrier spacing, cyclic prefix length, etc.) |
| Others | |

In addition to the configuration information described in Table 2, various parameters related to the bandwidth part may be configured for the terminal. The base station may transmit the above information to the terminal through higher layer signaling, for example, RRC signaling. At least one of the configured bandwidth parts may be activated. Information on whether or not to activate the configured bandwidth part may be transmitted from the base station to the terminal semi-statically through RRC signaling or dynamically through a MAC control element (CE) or DCI.

The configuration of the bandwidth part supported by the above-described 5G communication system may be used for various purposes.

For example, in the case where the bandwidth supported by the terminal is smaller than the system bandwidth, the bandwidth supported by the terminal may be supported by configuring the bandwidth part. For example, in Table 2, the frequency location (configuration information 2) of the bandwidth part may be configured for the terminal, so that the terminal may transmit and receive data in a specific frequency location within a system bandwidth.

As another example, the base station may configure a plurality of bandwidth parts for the terminal for the purpose of supporting different numerologies. For example, in order to support a certain terminal to transmit and receive data using both a subcarrier spacing of 15 kHz and a subcarrier spacing of 30 kHz, two bandwidth parts may be configured so as to use subcarrier spacing of 15 kHz and 30 kHz, respectively. Different bandwidth parts may be frequency-division-multiplexed (FDM), and in the case where data is to be transmitted and received in a specific subcarrier spacing, the bandwidth part configured as the corresponding subcarrier spacing may be activated.

As another example, the base station may configure a bandwidth part having different bandwidths for the terminal for the purpose of reducing power consumption by the terminal. For example, if the terminal supports a very large bandwidth, e.g., a bandwidth of 100 MHz, and transmits and receives data only in the corresponding bandwidth, it may cause a large amount of power consumption. In particular, in terms of power consumption, it is very inefficient for the terminal to monitor an unnecessary downlink control channel for a large bandwidth of 100 MHz in the absence of traffic. Therefore, in order to reduce power consumption by the terminal, the base station may configure a bandwidth part having a relatively small bandwidth, for example, a 20 MHz bandwidth part, for the terminal. The terminal may perform a monitoring operation in a 20 MHz bandwidth part in the absence of traffic, and if data is produced, the terminal may transmit and receive data using a 100 MHz bandwidth part according to the indication from the base station.

Figure 4:
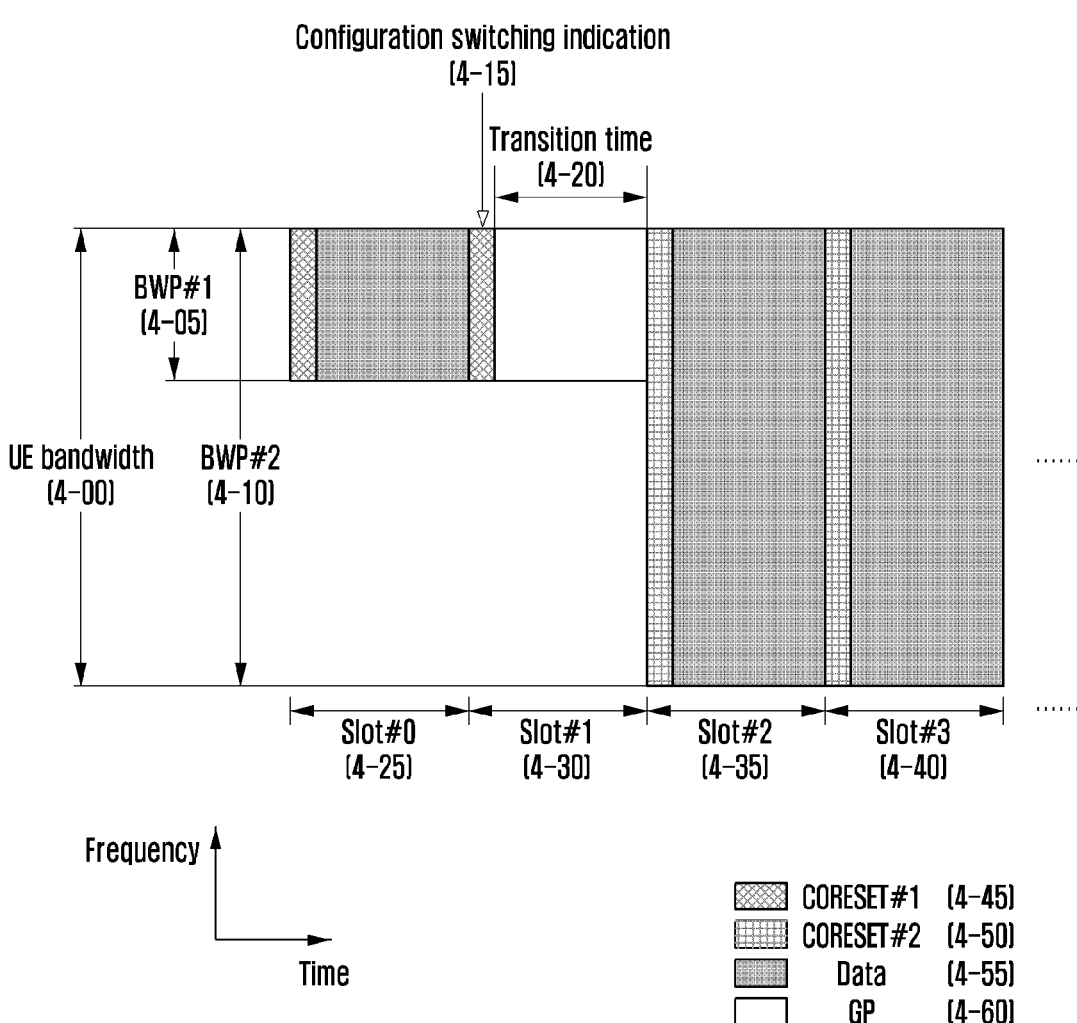
FIG. 4 illustrates a diagram of an example of indication and switching of a bandwidth part in a wireless communication system according to an embodiment.

FIG. 4 illustrates a diagram of an example of indication and switching of a bandwidth part in a wireless communication system according to an embodiment.

A method of dynamically changing the configuration of a bandwidth part will be described with reference to FIG. 4.

Referring to FIG. 4, as described in Table 2 above, the base station may configure one or more bandwidth parts for the terminal, and may transmit, to the terminal, information on the bandwidth of the bandwidth part, the frequency location of the bandwidth part, numerology of the bandwidth part, or the like, as the configuration for each bandwidth part. FIG. 4 illustrates an example in which two bandwidth parts, i.e., bandwidth part #1 (BPW #1) 4-05 and bandwidth part #2 (BWP #2) 4-10 are configured within a terminal bandwidth 4-00 for a terminal. One or more bandwidth parts may be activated in the configured bandwidth, and an example in which one bandwidth part is activated will be considered in FIG. 4.

In FIG. 4, the bandwidth part #1 (4-05) is in an active state among the bandwidth parts configured in slot #0 (4-25), and the terminal may monitor a physical downlink control channel (PDCCH) in a control resource set #1 (4-45) configured in bandwidth part #1 (4-05), and may transmit and receive data 4-55 in bandwidth part #1 (4-05). The control resource set in which the terminal monitors the PDCCH may be different according to the bandwidth part that is activated among the configured bandwidth parts, and the bandwidth in which the terminal monitors the PDCCH may vary according thereto.

The base station may further transmit, to the terminal, an indicator for switching the configuration of the bandwidth part. "Switching" the configuration of the bandwidth part may be regarded as the operation of activating a specific bandwidth part (for example, switching the activation from bandwidth part A to bandwidth part B). The base station may transmit a configuration switching indicator to the terminal in a specific slot, and the terminal may receive the configuration switching indicator from the base station, may then apply the configuration changed according to the configuration switching indicator at a specific time to determine the bandwidth part to be activated, and may monitor the PDCCH in the control resource set configure in the activated bandwidth part.

In FIG. 4, the base station may transmit, to the terminal, a configuration switching indicator 4-15 for instructing the terminal to switch the activated bandwidth part from existing bandwidth part #1 (4-05) to bandwidth part #2 (4-10) in slots #1 (4-30). Upon receiving the indicator, the terminal may activate bandwidth part #2 (4-10) according to the content of the indicator. In this case, a transition time 4-20 for switching the bandwidth part may be required, and the time for switching and applying the bandwidth part to be activated may be determined according thereto. FIG. 4 illustrates the case in which a transition time 4-20 of one slot elapses after receiving the configuration switching indicator 4-15. Data may not be transmitted and received during the transition time 4-20 (4-60). Accordingly, bandwidth part #2 (4-10) is activated in slot #2 (4-35), so that control channels and data may be transmitted and received in the corresponding bandwidth part.

The base station may preconfigure one or more bandwidth parts for the terminal using higher layer signaling (e.g., RRC signaling), and may indicate activation in such a manner that the configuration switching indicator 4-15 is mapped to one of the bandwidth parts preconfigured by the base station. For example, the indicator of log 2N bits may indicate to select one of N preconfigured bandwidth parts. An example of indicating configuration information on a bandwidth part using a 2-bit indicator is shown in Table 3 below.

TABLE 3

| Indicator values | Bandwidth part configuration |
|---|---|
| 00 | Bandwidth configuration A configured through higher layer signaling |
| 01 | Bandwidth configuration B configured through higher layer signaling |
| 10 | Bandwidth configuration C configured through higher layer signaling |
| 11 | Bandwidth configuration D configured through higher layer signaling |

The configuration switching indicator 4-15 for the bandwidth part described in FIG. 4 may be transmitted from the base station to the terminal using medium access control (MAC) control element (CE) signaling or L1 signaling (e.g., common DCI, group-common DCI, or terminal-specific DCI).

According to the configuration switching indicator 4-15 for the bandwidth part described in FIG. 4, the time at which activation of the bandwidth part is applied may be determined as follows. The time at which switching of the configuration is applied may follow a predefined value (e.g., applying the switching of the configuration N (≥1) slots after receiving the configuration switching indicator), may be configured by the base station for the terminal using higher layer signaling (e.g., RRC signaling), or may be included, in part, in the content of the configuration switching indicator 4-15 to then be transmitted. Alternatively, the time at which switching of the configuration is applied may be determined by a combination of the above-described methods. After receiving the configuration switching indicator 4-15 for the bandwidth part, the terminal may apply the switched configuration from the time obtained by the above-described methods.

Hereinafter, a downlink control channel in a 5G communication system will be described in more detail with reference to the accompanying drawings.

Figure 5:
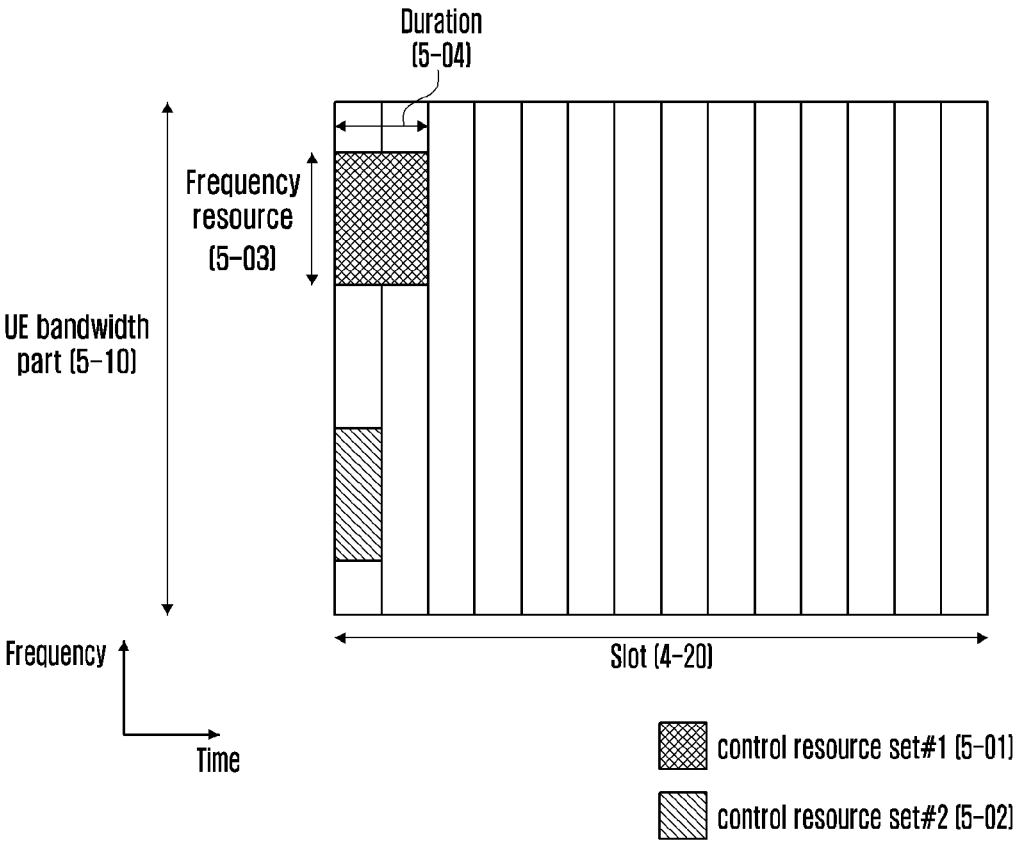
FIG. 5 illustrates a diagram of an example of a control resource set configuration in a downlink control channel in a wireless communication system according to an embodiment.

FIG. 5 illustrates a diagram of an example of a control resource set configuration in a downlink control channel in a wireless communication system according to an embodiment.

An example of a control resource set (CORESET) in which a downlink control channel is transmitted in a 5G wireless communication system will be described with reference to FIG. 5.

Referring to FIG. 5, FIG. 5 illustrates an example in which two control resource sets {control resource set #1 (5-01) and control resource set #2 (5-02)} are configured in a UE bandwidth part 5-10 on the frequency axis and one slot 5-20 on the time axis. The control resource set 5-01 or 5-02 may be configured in a specific frequency resource 5-03 within the entire UE bandwidth part 5-10 on the frequency axis. The control resource set 5-01 or 5-02 may be configured using one or more OFDM symbols on the time axis, and may be defined as control resource set duration 5-04. In the example shown in FIG. 5, control resource set #1 (5-01) is configured to have control resource set duration of two symbols, and control resource set #2 (5-02) is configured to have control resource set duration of one symbol.

The control resource sets in 5G described above may be configured for the terminal by the base station through higher layer signaling {e.g., system information, a master information block (MIB), or radio resource control (RRC) signaling}. Configuring the control resource set for the terminal means providing the terminal with information such as a control resource set identity, the frequency location of the control resource set, the symbol duration of the control resource set, and the like. For example, the information may include items shown in Table 4.

Figure 6:
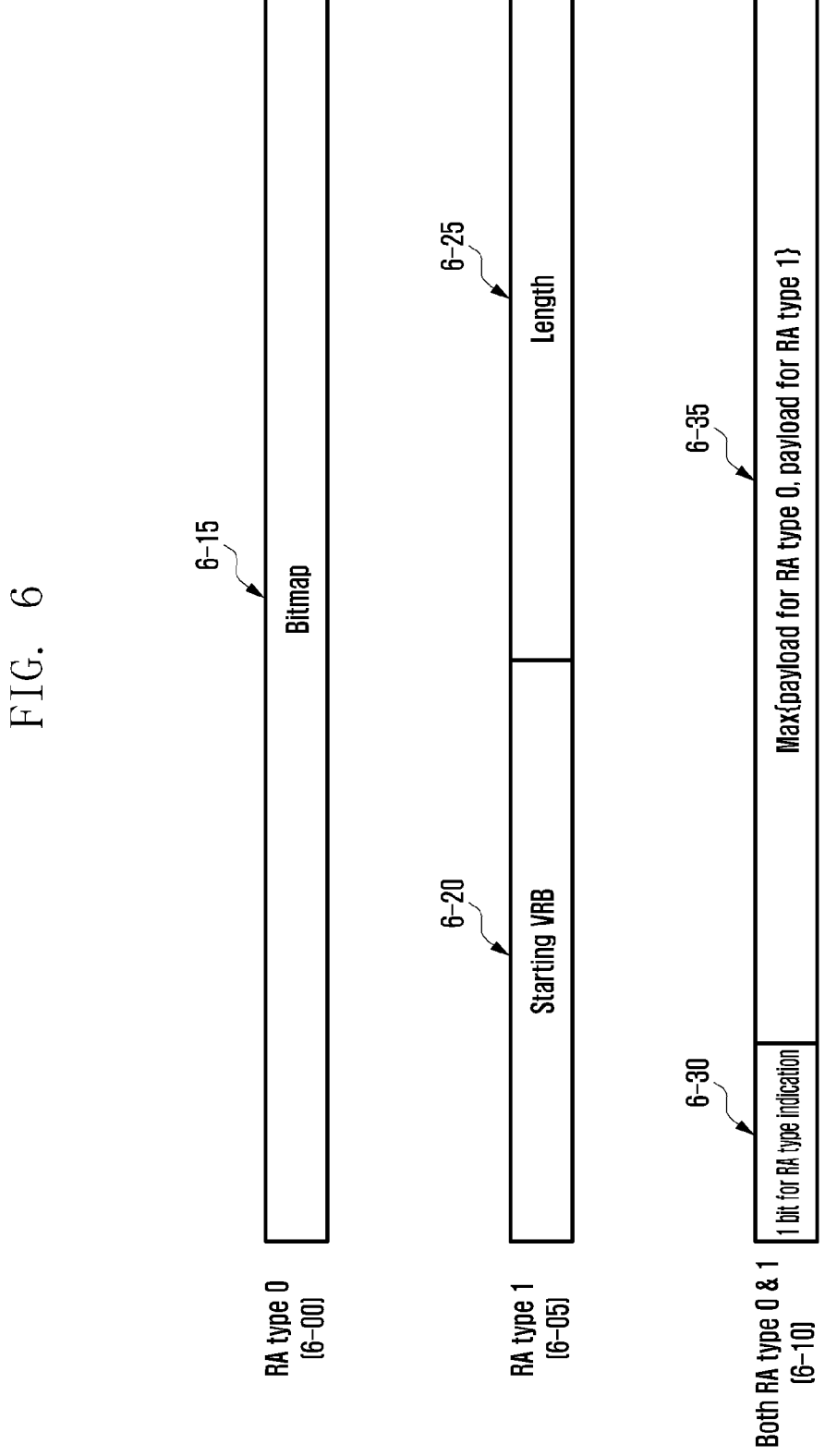
FIG. 6 illustrates a diagram of an example of physical downlink shared channel (PDSCH) frequency domain resource allocation in a wireless communication system according to an embodiment.

Referring to FIG. 6, in the case where a terminal is configured to use only resource type 0 through higher layer signaling (6-00), some downlink control information (DCI) for allocating PDSCHs to the terminal has a bitmap of NRBG bits. The conditions for this will be described later. In this case, NRBG indicates the number of resource block groups (RBGs) determined, as shown in Table 5 below, according to the size of a BWP allocated by a BWP indicator and the higher layer parameter "rbg-Size", and data is transmitted in the RBG represented as "1" using a bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

TABLE 4

| | |
|---|---|
| ControlResourceSet ::= | SEQUENCE { |
| -- Corresponds to L1 parameter 'CORESET-ID' | |
| controlResource SetId | ControlResourceSetId, |
| (Control resource set identity) | |
| frequencyDomainResources | BIT STRING (SIZE (45)), |
| (Frequency domain resource allocation information) | |
| duration | INTEGER (1..maxCoReSetDuration), |
| (Time domain resource allocation information) | |
| cce-REG-MappingType | CHOICE { |
| (CCE-to-REG mapping type) | |
| interleaved | SEQUENCE { |
| reg-BundleSize | ENUMERATED {n2, n3, n6}, |
| (Size of REG bundle) | |
| precoderGranularity | ENUMERATED {sameAsREG- |
| bundle, allContiguousRBs}, | |
| interleaverSize | ENUMERATED {n2, n3, n6} |
| (Size of interleaver) | |
| shiftIndex | |
| INTEGER(0..maxNrofPhysicalResourceBlocks-1) | |
| OPTIONAL | |
| (Interleaver Shift) | |
| }, | |
| nonInterleaved | NULL |
| }, | |
| tci-StatesPDCCH | SEQUENCE(SIZE (1..maxNrofTCI- |
| StatesPDCCH)) OF TCI-StateId | OPTIONAL, |
| (QCL configuration information) | |
| tci-PresentInDCI | ENUMERATED {enabled} |
| | OPTIONAL, -- Need S |
| } | |

In Table 4, "tci-StatesPDCCH" (simply referred to as "TCI state") configuration information includes information on one or more synchronization signals (SS)/physical broadcast channel (PBCH) block indexes or channel state information reference signal (CSI-RS) indexes having a QCL (quasi co-located) relationship with a demodulation reference signal (DMRS) transmitted in the corresponding control resource set.

Now, methods for allocating time and frequency resources for transmission of data in NR will be described.

NR may provide detailed frequency domain resource allocation (FD-RA) methods as follows, in addition to frequency domain resource candidate allocation through BWP indication. FIG. 6 illustrates a diagram of an example of physical downlink shared channel (PDSCH) frequency domain resource allocation in a wireless communication system according to an embodiment.

FIG. 6 illustrates three frequency domain resource allocation methods of type 0 (6-00), type 1 (6-05), and dynamic switch 6-10, which may be configured through a higher layer in NR.

In the case where the terminal is configured to use only resource type 1 through higher layer signaling (6-05), some DCI for allocating PDSCHs to the terminal has frequency domain resource allocation information including $$\left\lceil \log_2\left(N_{RB}^{DL,BWP}\left(N_{RB}^{DL,BWP}+1\right)/2\right)\right\rceil \text{ bits.}$$

bits. The conditions for this will be described again later. The base station may configure starting VRB 6-20 and the length 6-25 of the frequency domain resource subsequent thereto.

Figure 7:
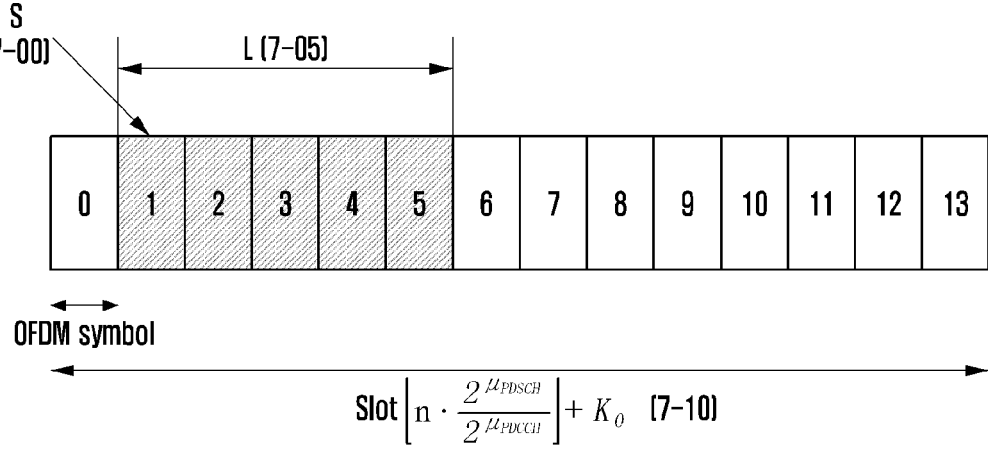
FIG. 7 illustrates a diagram of an example of PDSCH time domain resource allocation in a wireless communication system according to an embodiment.

If the terminal is configured to use both resource type 0 and resource type 1 through higher layer signaling (6-10), some DCI for allocating the PDSCHs to the corresponding terminal has frequency domain resource allocation information including bits of a large value 6-35 among the payload 6-15 for configuring resource type 0 and the payloads 6-20 and 6-25 for configuring resource type 1. The conditions for this will be described again later. In this case, one bit may be added to the foremost part (MSB) of the frequency domain resource allocation information in the DCI, and bit 0 indicates that resource type 0 is used, and bit 1 indicates that resource type 1 is used. FIG. 7 illustrates a diagram of an example of PDSCH time domain resource allocation in a wireless communication system according to an embodiment.

FIG. 7 illustrates a diagram of an example of allocating time domain resources in NR.

Referring to FIG. 7, the base station may indicate the time domain location of a PDSCH resource according to subcarrier spacing (SCS) ($\mu^{PDSCH}$ and $\mu_{PDCCH}$) of a data channel and a control channel configured using a higher layer, a scheduling offset value (K0), the starting location 7-00 of OFDM symbols in one slot dynamically indicated through DCI, and the length 7-05 thereof.

Figure 8:
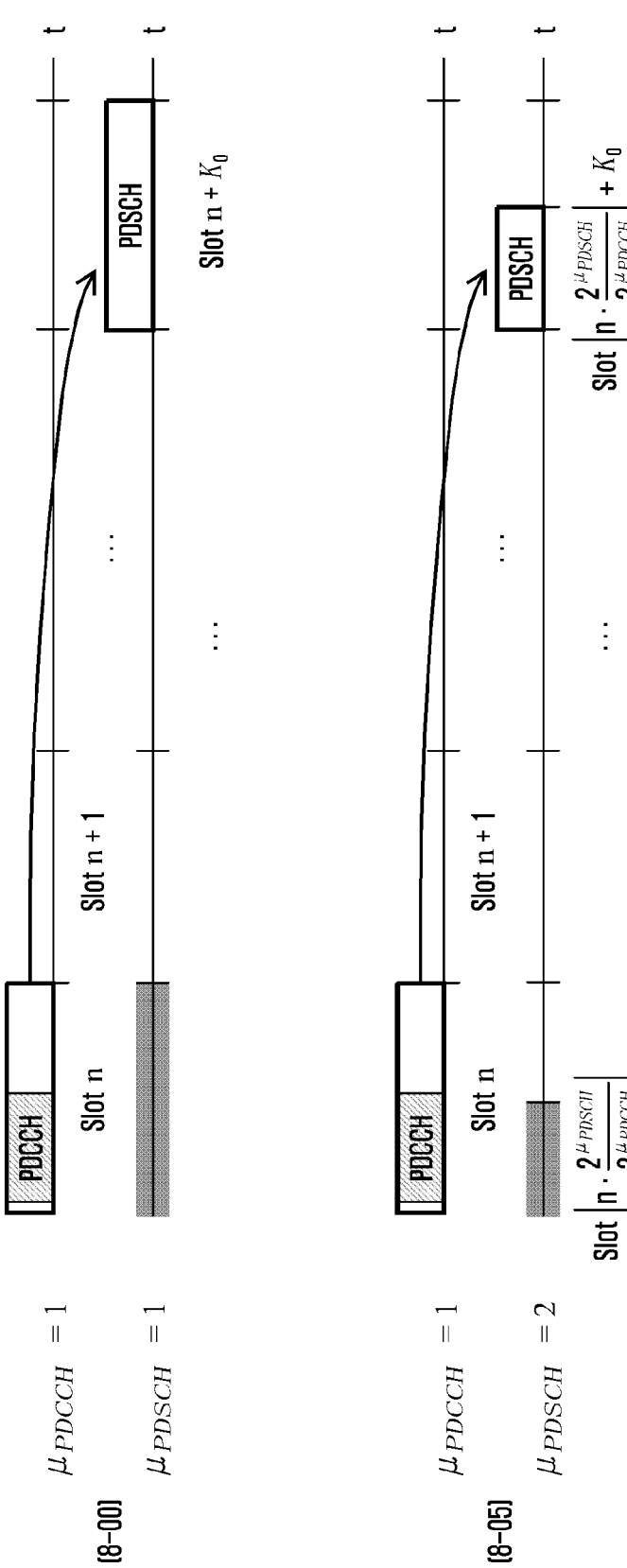
FIG. 8 illustrates a diagram of an example of time domain resource allocation according to subcarrier spacing of a data channel and a control channel in a wireless communication system according to an embodiment.

FIG. 8 illustrates a diagram of an example of time domain resource allocation according to subcarrier spacing of a data channel and a control channel in a wireless communication system according to an embodiment.

Referring to FIG. 8, if the subcarrier spacing of the data channel is the same as the subcarrier spacing of the control channel ($\mu_{PDSCH}=\mu_{PDCCH}$) (8-00), the slot numbers for the data and the control are the same. Accordingly, the base station and the terminal may recognize the occurrence of scheduling offset according to a predetermined slot offset (K0). On the other hand, if the subcarrier spacing of the data channel is different from the subcarrier spacing of the control channel ($\mu_{PDSCH}\neq\mu_{PDCCH}$) (8-05), the slot numbers for the data and the control are different from each other. Accordingly, the base station and the terminal may recognize the occurrence of scheduling offset according to a predetermined slot offset (K0), based on the subcarrier spacing of the PDCCH.

Although the offset analysis method for the case where the subcarrier spacing between the data channel and the control channel is the same or different has been described in FIG. 8, the above method is not limited thereto. Similarly, the method may also be applied to the case where the subcarrier spacing between control channels or reference signals is the same or different such as the case where the subcarrier spacing between the CSI-RS and the control channel or the subcarrier spacing between the SRS and the control channel is the same or different.

NR provides various types of DCI formats as shown in Table 6 below in order for the terminal to efficiently receive a control channel.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 in order to schedule PDSCHs for a single cell.

DCI format 0_1 includes at least the following information in the case where DCI format 0_1 is transmitted together with CRC scrambled by a cell radio network temporary identifier (C-RNTI), a configured scheduling RNTI (CS-RNTI), or a new-RNTI.

Identifier for DCI formats (1 bits): This is a DCI format indicator, which is always configured as "1".

Frequency domain resource assignment (NRBG bits or $$\lceil \log_2(N_{RB}^{DL,BWP}(N_{RB}^{DL,BWP}+1)/2)\rceil \text{ bits}).$$

bits): This indicates frequency domain resource allocation, and if DCI format 1_0 is monitored in the UE specific search space, $$N_{RB}^{DL,BWP}$$

indicates the size of an active DL BWP. Otherwise, $$N_{RB}^{DL,BWP}$$

indicates the size of an initial DL BWP. The NRBG is the number of resource block groups. Refer to the above frequency domain resource allocation for details thereof.

Time domain resource assignment (0 to 4 bits): This indicates time domain resource allocation according to the above description.

VRB-to-PRB mapping (1 bit): "0" indicates non-interleaved VRB-to-PRB mapping, and "1" indicates interleaved VRP-to-PRB mapping.

Modulation and coding scheme (5 bits): This indicates a modulation order and a coding rate used in transmission of a PDSCH.

New data indicator (1 bit): This indicates whether the PDSCH corresponds to initial transmission or retransmission according to toggling.

Redundancy version (2 bits): This indicates the redundancy version used for the transmission of a PDSCH.

HARQ process number (4 bits): This indicates an HARQ process number used in transmission of a PDSCH.

Downlink assignment index (2 bits): This is a DAI indicator.

TPC command for scheduled PUCCH (2 bits): This is a PUCCH power control indicator PUCCH resource indicator (3 bits): This is a PUCCH resource indicator and indicates one of eight resources configured using a higher layer.

PDSCH-to-HARQ_feedback timing indicator (3 bits): This is a HARQ feedback timing indicator and indicates one of eight feedback timing offsets configure using a higher layer.

DCI format 1_1 includes at least the following information in the case where DCI format 1_1 is transmitted together with CRC scrambled by a cell radio network temporary identifier (C-RNTI), a configured scheduling RNTI (CS-RNTI) or a new-RNTI.

Identifier for DCI formats (1 bit): This is a DCI format indicator, which is always configured as "1".

Carrier indicator (0 or 3 bits): This indicates a CC (or a cell) in which the PDSCH allocated by a corresponding DCI is transmitted.

Bandwidth part indicator (0, 1, or 2 bits): This indicates the BWP through which the PDSCH allocated by a corresponding DCI is transmitted.

Frequency domain resource assignment (a payload is determined according to the frequency domain resource allocation): This indicates frequency domain resource allocation, and $$N_{RB}^{DL,BWP}$$

and indicates the size of an active DL BWP. Refer to the frequency domain resource allocation for details thereof.

Time domain resource assignment (0 to 4 bits): This indicates time domain resource allocation according to the above description.

VRB-to-PRB mapping (0 or 1 bit): "0" indicates non-interleaved VRB-to-PRB mapping, and "1" indicates interleaved VRP-to-PRB mapping. This is 0 bit in the case where the frequency domain resource allocation is configured as resource type 0.

PRB bundling size indicator (0 or 1 bit): This is 0 bit if a higher layer parameter "prb-BundlingType" is not configured or is configured as "static", and is 1 bit if a higher layer parameter "prb-BundlingType" is configured as "dynamic".

Rate matching indicator (0 or 1 or 2 bits): This indicates a rate matching pattern.

ZP CSI-RS trigger (0 or 1 or 2 bits): This is an indicator for triggering an aperiodic ZP CSI-RS.

For transport block 1:

Modulation and coding scheme (5 bits): This indicates a modulation order and a coding rate used for the transmission of a PDSCH.

New data indicator (1 bit): This indicates whether the PDSCH corresponds to initial transmission or retransmission according to toggling.

Redundancy version (2 bits): This indicates the redundancy version used in transmission of a PDSCH.

For transport block 2:

Modulation and coding scheme (5 bits): This indicates a modulation order and a coding rate used for the transmission of a PDSCH.

New data indicator (1 bit): This indicates whether the PDSCH corresponds to initial transmission or retransmission according to toggling.

Redundancy version (2 bits): This indicates the redundancy version used in transmission of a PDSCH.

HARQ process number (4 bits): This indicates an HARQ process number used in transmission of a PDSCH.

Downlink assignment index (0, 2, or 4 bits): This is a DAI indicator.

TPC command for scheduled PUCCH (2 bits): This is a PUCCH power control indicator PUCCH resource indicator (3 bits): This is a PUCCH resource indicator and indicates one of eight resources configured using a higher layer.

PDSCH-to-HARQ_feedback timing indicator (3 bits): This is a HARQ feedback timing indicator and indicates one of eight feedback timing offsets configured using a higher layer.

Antenna port (4, 5, or 6 bits): This indicates a DMRS port and a CDM group without data.

Transmission configuration indication (0 or 3 bits): a TCI indicator.

SRS request (2 or 3 bits): an SRS transfer request indicator

CBG transmission information (0, 2, 4, 6, or 8 bits): This is an indicator indicating whether or not to transmit code block groups in the allocated PDSCH. "0" indicates that a corresponding CBG is not to be transmitted, and "1" indicates that a corresponding CBG is to be transmitted.

CBG flushing out information (0 or 1 bit): This is an indicator indicating whether or not previous CBGs are contaminated. "0" indicates that the previous CBGs might be contaminated, and "1" indicates that the previous CBGs are combinable when receiving a retransmission.

DMRS sequence initialization (0 or 1 bit): a DMRS scrambling ID selection indicator The number of DCIs having different sizes that the terminal is capable of receiving for each slot in a corresponding cell is up to 4. The number of DCIs having different sizes, which are scrambled with a C-RNTI that can be received by the terminal for each slot in a corresponding cell, is up to 3. Here, the antenna port indication may be indicated through the following Tables 7 to 10.

TABLE 7

| Antenna port(s) (1000 + DMRS port), dmrs-Type = 1, maxLength = 1 One Codeword: Codeword 0 enabled, Codeword 1 disabled | | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 9

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 10

| Antenna port(s) (1000 + DMRS port), dmrs-Type = 2, maxLength = 2 | | | | | | | |
| One codeword: Codeword 0 enabled, Codeword 1 disabled | | | | Two Codewords: Codeword 0 enabled, Codeword 1 enabled | | | |
| Value | Number of DMRS CDM group(s) without data | DMRS port(s) | Number of front-load symbols | Value | Number of DMRS CDM group(s) without data | DMRS port(s) | Number of front-load symbols |
|---|---|---|---|---|---|---|---|
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Table 7 is used when "dmrs-type" is indicated as 1 and "maxLength" is indicated as 1, and Table 8 is used when "dmrs-type"=1 and "maxLength"=2. In addition, the port of the DMRS to be used is indicated using Table 9 when "dmrs-type"=2 and "maxLength"=1, and Table 10 when "dmrs-type"=2 and "maxLength"=2.

The numbers 1, 2, and 3 indicated by "Number of DMRS CDM group(s) without data" in the tables denote CDMR groups {0}, {0, 1}, and {0, 1, 2}, respectively. "DMRS port(s)" show indexes of the used ports arranged in sequence. The antenna port is indicated as "DMRS port+ 1000". The CDM group of the DMRS is associated with a method of generating a DMRS sequence and the antenna ports as shown in Tables 11 and 12. Table 11 shows parameters when "dmrs-type"=1, and Table 12 shows parameters when "dmrs-type"=2.

TABLE 11

Parameters for PDSCH DM-RS dmrs-type = 1

| | CDM | | $w_f(k')$ | | $w_t(l')$ | |
|---|---|---|---|---|---|---|
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for PDSCH DM-RS dmrs-type = 2

| | CDM | | $w_f(k')$ | | $w_t(l')$ | |
|---|---|---|---|---|---|---|
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The sequence of DMRSs according to respective parameters is determined using Formula 1 below.

$$a_{k,l}^{(p,\mu)} = \beta_{PDSCH}^{DMRS} w_f(k') w_t(l') r(2n + k') \qquad \text{(Formula 1)}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \overline{l} + l'$$

$$n = 0, 1, \ldots$$

Figure 9:
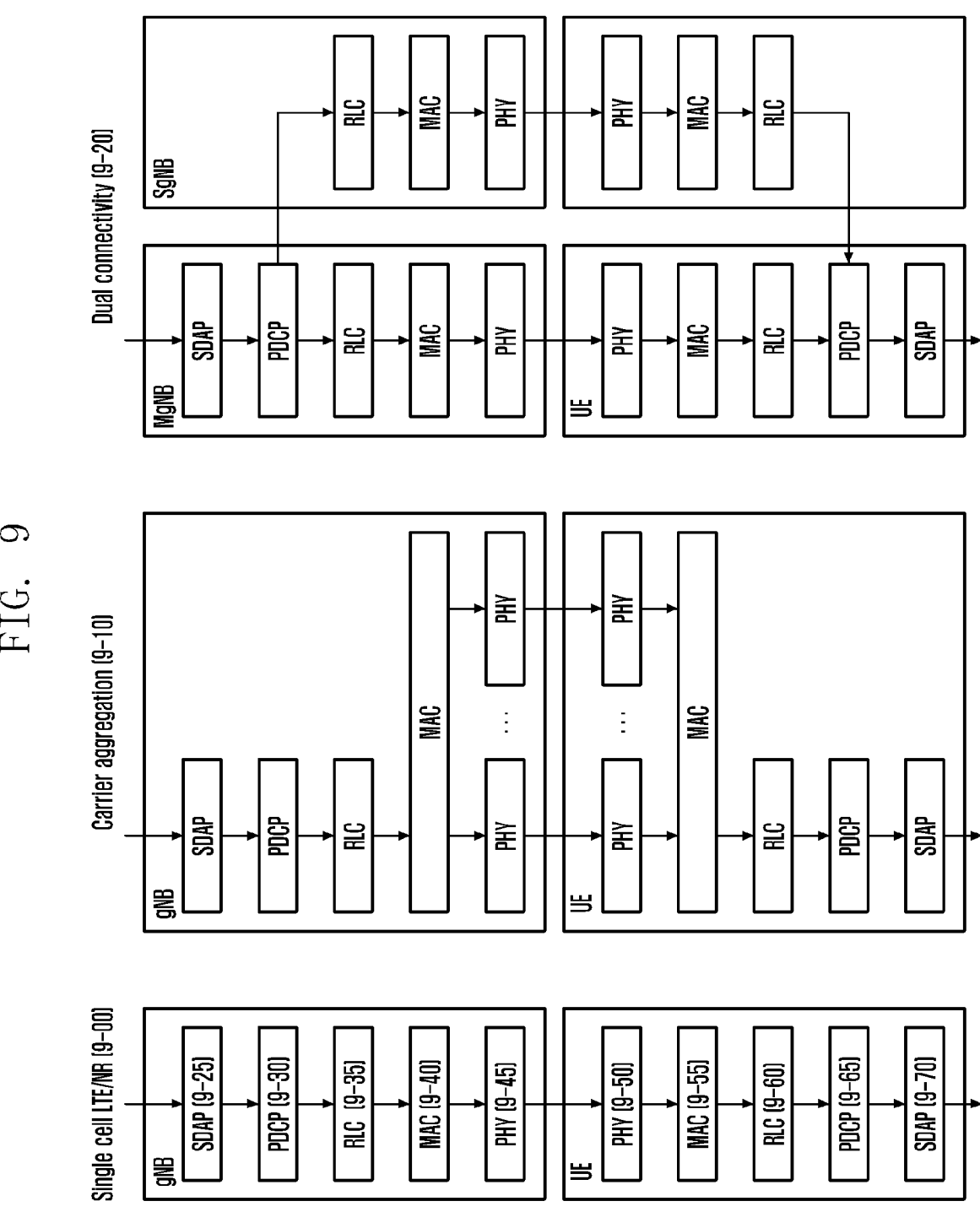
FIG. 9 illustrates a diagram of protocol stacks of a base station and a terminal in the case of a single cell, carrier aggregation, and dual connectivity (DC) in a wireless communication system according to an embodiment.

FIG. 9 illustrates a diagram of the radio protocol structure of a base station and a terminal in the case of a single cell, carrier aggregation, and dual connectivity, respectively, according to an embodiment.

Referring to FIG. 9, the radio protocol of the next-generation mobile communication system includes NR service data adaption protocol (SDAP) 9-25 or 9-70, NR packet data convergence protocol (PDCP) 9-30 or 9-65, NR radio link control (RLC) 9-35 or 9-60, and NR medium access control (MAC) 9-40 or 9-55 in a terminal and an NR base station, respectively.

The primary functions of the NR SDAP 9-25 or 9-70 may include some of the following functions.

Transfer of user plane data
Mapping between QoS flow and DRB for DL and UL
Marking QoS flow ID in both DL and UL packets
Mapping reflective QoS flow to DRB for UL SDAP PDUs
With regard to the SDAP layer entity, the terminal may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, a 1-bit NAS reflective QoS configuration indicator and a 1-bit AS reflective QoS configuration indicator of the SDAP header may instruct the terminal to update or reconfigure mapping information between the QoS flow and the data bearers in uplink and downlink. The SDAP header may include QoS flow ID information indicating the QoS. The QoS information may be used as data processing priority, scheduling information, or the like in order to support effective services.

The primary functions of the NR PDCP 9-30 or 9-65 may include some of the following functions.

Header compression and decompression (ROHC only)
Transfer of user data
In-sequence delivery of upper layer PDUs
Out-of-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink The above reordering function of the NR PDCP entity denotes a function of reordering PDCP PDUs received from a lower layer, based on a PDCP sequence number (SN), may include a function of transmitting data to a higher layer in the reordered order, may include a function of directly transmitting data without consideration of an order, may include a function of reordering the sequence and recording lost PDCP PDUs, may include a function of sending a status report of the lost PDCP PDUs to the transmitting end, and may include a function of making a request for retransmission of the lost PDCP PDUs.

The primary functions of the NR RLC 9-35 or 9-60 may include some of the following functions.

Data transfer function (transfer of upper layer PDUs)
In-sequence delivery of upper layer PDUs
Out-of-sequence delivery of upper layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The above in-sequence delivery function of the NR RLC entity denotes a function of transferring RLC SDUs received from a lower layer to a higher layer in sequence, may include a function of, if one original RLC SDU is divided into a plurality of RLC SDUs and received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to the transmitting end, may include a function of making a request for retransmission of the lost RLC PDUs, may include a function of, if there is a lost RLC SDU, transmitting only the RLC SDUs prior to the lost RLC SDU to a higher layer in sequence, may include a function of, if a predetermined timer expires even though there is a lost RLC SDU, transmitting all RLC SDUs received before the timer starts to a higher layer in sequence, or may include a function of, if a predetermined timer expires even though there is a lost RLC SDU, transmitting all RLC SDUs received until the present to a higher layer in sequence. In addition, the RLC PDUs may be processed in the order of reception (in the order of arrival regardless of a serial number or a sequence number thereof), and may be transmitted to the PDCP entity in an out-of-sequence delivery manner. In the case of segments, the segments, which are stored in the buffer or will be received later, may be received and reconfigured into one complete RLC PDU, and the RLC PDU may be processed and transmitted to the PDCP entity. The NR RLC layer may not include a concatenation function, which may be performed in the NR MAC layer or may be replaced with a multiplexing function of the NR MAC layer.

The out-of-sequence delivery of the NR RLC entity denotes a function of directly transmitting RLC SDUs received from a lower layer to a higher layer regardless of sequence, may include a function of, if one original RLC SDU is divided into a plurality of RLC SDUs and is received, reassembling and transmitting the same, and may include a function of storing and ordering RLC SNs or PDCP SNs of the received RLC PDUs, thereby recording the lost RLC PDUs.

The NR MAC 9-40 or 9-55 may be connected to a plurality of NR RLC entities configured in a single terminal, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers 9-45 and 9-50 may perform operations of channel-coding and modulating the higher layer data into OFDM symbols and transmitting the same through a radio channel, or operations of demodulating and channel-decoding the OFDM symbols received through the radio channel and transmitting the same to the higher layer.

The detailed structures of the radio protocols may be changed in various ways according to a carrier (or cell) operating scheme. For example, in the case where a base station transmits data to a terminal, based on a single carrier (or cell), the base station and the terminal use a single protocol structure for the respective layers as shown in 9-00. On the other hand, in the case where a base station transmits data to a terminal, based on carrier aggregation (CA) using multiple carriers in a single TRP, the base station and the terminal use a protocol structure in which a single structure is provided until the RLC layer and the PHY layer is multiplexed through the MAC layer as shown in 9-10. As another example, in the case where a base station transmits data to a terminal, based on dual connectivity (DC) using multiple carriers in multiple TRPs, the base station and the terminal use a protocol structure in which a single structure is provided until the RLC layer and the PHY layer is multiplexed through the MAC layer as shown in 9-20.

In LTE and NR, the terminal has a procedure of reporting capability supported by the terminal to a corresponding base station while being connected to a serving base station, which will be referred to as "UE capability (reporting)" in the following description. The base station may transmit a UE capability enquiry message requesting capability reporting to a terminal in a connected state. The message may include a request for terminal capability for each RAT type by the base station. The request for each RAT type may include information on a requested frequency band. In addition, the UE capability enquiry message may be transmitted while requesting a plurality of RAT types through a single RRC message container, or a plurality of UE capability enquiry messages including requests for respective RAT types may be included to then be transmitted to the terminal. That is, the UE capability enquiry may be repeated multiple times, and the terminal may configure a UE capability information message corresponding thereto, and may report the same multiple times. In the next-generation mobile communication system, a request for terminal capability may be performed for MR-DC, as well as NR, LTE, and EN-DC. For reference, the UE capability enquiry message is generally transmitted in the initial stage after the terminal is connected, but the base station is capable of requesting the UE capability under any condition as necessary.

In the above step, the terminal receiving the request for reporting the UE capability from the base station configures terminal capability according to the RAT type requested by the base station and band information. A method of configuring UE capability by the terminal in an NR system will be summarized below.

1. If the terminal receives a list of LTE and/or NR bands through a UE capability request from the base station, the terminal configures a band combination (BC) for EN-DC and NR stand-alone (SA). In other words, the terminal configures a candidate list of BCs for EN-DC and NR SA, based on the bands requested by the base station using "FreqBandList". In addition, the bands have priority in the order as described in "FreqBandList".

2. If the base station requests UE capability reporting by setting "eutra-nr-only" flag or "eutra" flag, the terminal completely removes the NR SA BCs from the configured candidate list of BCs. This operation may be performed only when an LTE base station (eNB) requests "eutra" capability.

3. Thereafter, the terminal removes fallback BCs from the candidate list of BCs configured in the above step. The fallback BC corresponds to the case in which the band corresponding to at least one SCell is removed from certain super set BCs, and the fallback BC may be omitted because the super configure BCs are capable of covering the fallback BC. This step is also applied to the MR-DC, i.e. LTE bands. The remaining BCs after this step constitute a final "candidate BC list".

4. The terminal selects the BCs to be reported, which conform to the requested RAT type, from the final "candidate BC list". In this step, the terminal configures "supportedBandCombinationList" in a predetermined order. In other words, the terminal configures the BCs and UE capability to be reported in the order of the preconfigured RAT types (nr→eutra-nr→eutra). In addition, the terminal configures "featureSetCombination" for the configured "supportedBandCombinationList" and configures a list of "candidate feature set combinations" from the candidate BC list from (FR1) and bands from 24250 MHz to 52600 MHz are classified into frequency range 2 (FR2). NR supports the operation bands shown in Tables 13 and 14 for the FR1 and FR2 bands. The values in Tables 13 and 14 are determined according to local policies and regulations, and may be changed according to the future situation. In addition, in the case of CA or DC, NR operation band pairs may be determined in a manner similar to Table 13 or 14.

TABLE 13

| NR operating bands in FR1 | | | |
|---|---|---|---|
| NR operating band | Uplink (UL) operating band BS receive/UE transmit $F_{UL\_low}$-$F_{UL\_high}$ | Downlink (DL) operating band BS transmit/UE receive $F_{DL\_low}$-$F_{DL\_high}$ | Duplex Mode |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD[1] |
| n51 | 1427 MHz-1432 MHZ | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

NOTE 1:

UE that complies with the NR Band n50 minimum requirements in this specification shall also comply with the NR Band n51 minimum requirements.
NOTE 2:

UE that complies with the NR Band n75 minimum requirements in this specification shall also comply with the NR Band n76 minimum requirements.

which the list of the fallback BCs (including capabilities in the equal or lower level) is removed. The "candidate feature set combination" may include the feature set combinations for BCs both of NR and EUTRA-NR, and may be obtained from the feature set combinations of the "UE-NR-Capabilities" and "UE-MRDC-Capabilities" containers.

5. In addition, if the requested RAT type is "eutra-nr" and has affects, "featureSetCombinations" is included in both containers of "UE-MRDC-Capabilities" and "UE-NR-Capabilities". However, the feature set of NR is included only in "UE-NR-Capabilities".

After the terminal capability is configured, the terminal transmits a UE capability information message including the UE capability to the base station. Then, the base station performs an appropriate scheduling and transmission/reception management for the terminal, based on the UE capability received from the terminal.

In NR, according to the frequency bands, bands from 450 MHz to 6000 MHz are classified into frequency range 1

TABLE 14

| NR operating bands in FR2 | | | |
|---|---|---|---|
| Operating Band | Uplink (UL) operating band BS receive UE transmit $F_{UL\_low}$-$F_{UL\_high}$ | Downlink (BL) operating band BS transmit UE receive $F_{DL\_low}$-$F_{DL\_high}$ | Duplex Mode |
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

NR supports four types of terminals according to power classes as shown in Table 15.

TABLE 15

| UE Power class | UE type |
|---|---|
| 1 | Fixed wireless access(FWA) UE |
| 2 | Vehicular UE |
| 3 | Handheld UE |
| 4 | High power non-handheld UE |

In NR, as shown in Table 16, various maximum UE output powers are defined according to the NR operation bands in Tables 13 and 14 and the type of terminal in Table 15 for FR1 terminals. The measurement interval in Table 16 is at least one subframe (1 ms).

TABLE 16

| NR band | Class 1 (dBm) | Tolerance (dB) | Class 2 (dBm) | Tolerance (dB) | Class 3 (dBm) | Tolerance (dB) |
|---|---|---|---|---|---|---|
| n1 | | | | | 23 | ±2 |
| n2 | | | | | 23 | ±2[3] |
| n3 | | | | | 23 | ±2[3] |
| n5 | | | | | 23 | ±2 |
| n7 | | | | | 23 | ±2[3] |
| n8 | | | | | 23 | ±2[3] |
| n12 | | | | | 23 | ±2[3] |
| n20 | | | | | 23 | ±2[3] |
| n25 | | | | | 23 | ±2 |
| n28 | | | | | 23 | +2/−2.5 |
| n34 | | | | | 23 | ±2 |
| n38 | | | | | 23 | ±2 |
| n39 | | | | | 23 | ±2 |
| n40 | | | | | 23 | ±2 |
| n41 | | | 26 | +2/−3[3] | 23 | ±2[3] |
| n50 | | | | | 23 | ±2 |
| n51 | | | | | 23 | ±2 |
| n66 | | | | | 23 | ±2 |
| n70 | | | | | 23 | ±2 |
| n71 | | | | | 23 | +2/−2.5 |
| n74 | | | | | 23 | ±2 |
| n77 | | | 26 | +2/−3 | 23 | +2/−3 |
| n78 | | | 26 | +2/−3 | 23 | +2/−3 |
| n79 | | | 26 | +2/−3 | 23 | +2/−3 |
| n80 | | | | | 23 | ±2 |
| n81 | | | | | 23 | ±2 |
| n82 | | | | | 23 | ±2 |
| n83 | | | | | 23 | ±2/−2.5 |
| n84 | | | | | 23 | ±2 |
| n86 | | | | | 23 | ±2 |

NOTE 1:
$P_{PowerClass}$ is the maximum UE power specified without taking into account the tolerance
NOTE 2:
Power class 3 is default power class unless otherwise stated
NOTE 3:
Refers to the transmission bandwidths (FIG. 5.3.3-1) confined within $F_{UL\_low}$ and $F_{UL\_low}$ + 4 MHz or $F_{UL\_high}$ − 4 MHz and $F_{UL\_high}$, the maximum output power requirement is relaxed by reducing the lower tolerance limit by 1.5 dB The terminal is allowed to reduce the maximum output power in the case where a modulation order is high or according to the transmission bandwidth configuration, which is called "maximum power reduction (MPR)". MPR values allowed according to the power classes of the terminal are shown in Table 17 and Table 18.

TABLE 17

MPR for power class 3

| | MPR (dB) | | |
|---|---|---|---|
| Modulation | Edge RB allocations | Outer RB allocations | Inner RB allocations |
| DFT-s-OFDM PI/2 BPSK | ≤3.5[1] 0.5[2] | ≤1.2[1] 0.5[2] | ≤0.2[1] 0[2] |
| DFT-s-OFDM QPSK | ≤1 | | 0 |
| DFT-s-OFDM 16 QAM | ≤2 | | ≤1 |
| DFT-s-OFDM 64 QAM | | ≤2.5 | |
| DFT-s-OFDM 256 QAM | | 4.5 | |
| CP-OFDM-QPSK | ≤3 | | ≤1.5 |
| CP-OFDM 16 QAM | ≤3 | | ≤2 |
| CP-OFDM 64 QAM | | ≤3.5 | |
| CP-OFDM 256 QAM | | ≤6.5 | |

NOTE 1:
Applicable for UE operating in TDD mode with PI/2 PBSK modulation and UE indicates support for UE capability [powerBoosting-pi2BPSK] and if the powerBoostPI2BPSK is set to 1 and 40% or less slots in radio frame are used for UL transmission for bands n40, n41, n77, n78 and n79. The reference power of 0 dB MPR is 26 dBm.
NOTE 2:
Applicable for UE operating in FDD mode, or in TDD mode in bands other than n40, n41, n77, n78 and n79 and if the IE powerBoostPI2BPSK is set to 0 and if more than 40% of slots in radio frame are used for UL transmission for bands n40, n41, n77, n78 and n79.

TABLE 18

MPR for power class 2

| | MPR (dB) | | |
|---|---|---|---|
| Modulation | Edge RB allocations | Outer RB allocations | Inner RB allocations |
| DFT-s-OFDM PI/2 BPSK | ≤3.5 | ≤0.5 | 0 |
| DFT-s-OFDM QPSK | ≤3.5 | ≤1 | 0 |
| DFT-s-OFOM 16 QAM | ≤3.5 | ≤2 | ≤1 |
| DFT-s-OFDM 64 QAM | ≤3.5 | | ≤2.5 |
| DFT-s-OFDM 256 QAM | | ≤4.5 | |
| CP-OFDM QPSK | ≤3.5 | ≤3 | ≤1.5 |
| CP-OFDM 16 QAM | ≤3.5 | ≤3 | ≤2 |
| CP-OFDM 64 QAM | | ≤3.5 | |
| CP-OFDM 256 QAM | | ≤6.5 | |

The network may inform the terminal of additional emission requirements through the RRC signaling associated with an NR frequency band number of the NR operation band according to Tables 13 and 14, and the terminal may perform additional MPR based thereon. This is called "additional maximum power reduction (A-MPR)". For example, in NR band n51, when "additionalSpectrumEmission=1" is set through higher layer signaling, NS_40 is assumed, and A-MPR as shown in Table 19 is applied thereto.

TABLE 19

A-MPR for NS_40

| | A-MPR Channel bandwidth (MHz): 5 MHz | |
|---|---|---|
| Modulation | Outer RB allocations | Inner RB allocations |
| DFT-s-OFDM QPSK | 15.5 | 12 |
| DFT-s-OFDM 16 QAM | 14.5 | 11 |
| DFT-s-OFDM 64 QAM | 14.5 | 10 |
| DFT-s-OFDM 256 QAM | 12.5 | 7.5 |
| CP-OFDM QPSK | 14.5 | 10 |
| CP-OFDM 16 QAM | 14.5 | 10 |

TABLE 19-continued

A-MPR for NS_40

| | A-MPR Channel bandwidth (MHz): 5 MHz | |
| --- | --- | --- |
| Modulation | Outer RB allocations | Inner RB allocations |
| CP-OFDM 64 QAM | 14 | 8 |
| CP-OFDM 256 QAM | 11 | 5.5 |

NOTE 1:
The total maximum output power reduction for NS_40 is obtained by taking the maximum value of MPR + A-MPR specified in Table 6.2.3-1 and Table 6.2.4-30a in TS 36.101 and MPR + A-MPR specified in Table 6.2.2-1 and Table 6.2.3.5-1.

Meanwhile, the US Federal Communications Commission (FCC) regulates a radio wave absorption rate into the human body due to wireless communication devices through the RF-exposure regulation, and it must be proved that respective wireless communication devices satisfy the above regulation by calculating maximum permissible exposure (MPE) thereof. For example, the maximum power density "S" (mW/cm$^2$) at a specific distance "R" (cm) may be calculated as shown in Equation 1, based on equivalent isotropic radiated power (EIRP) (mW).

$$S = \text{EIRP}/(4 \cdot R^2 \cdot \pi) \qquad \text{[Equation 1]}$$

Considering the case where R=20 cm and EIRP=65 mW, "S" is less than approximately 0.02 mW/cm2, which may be compared with an MPE value at the corresponding frequency as defined by the FCC, thereby determining whether or not the device satisfies the regulation.

The MPE value generally varies with frequency and especially, has more stringent criteria as frequency bands increase because higher frequencies are more harmful. In addition, there may be various criteria such as measuring the absorption rate on the surface of the human body depending on bands or measuring the power density in the worst case, that is, in the direction having the highest emission power, in a free space at a predetermined distance.

Hereinafter, requirements for satisfying RF-exposure regulation-related restrictions will be referred to as "MPE requirements" for the convenience of explanation. LTE and NR provide power management maximum power reduction (P-MPR) for MPE requirements.

The terminal may have upper and lower limits as shown in Equation 2 for the configured maximum output power PCMAX.

$$P_{CMAX\_L} \leq P_{CMAX} \leq P_{CMAX\_H} \qquad \text{[Equation 2]}$$

In Equation 2, $P_{CMAX\_H}$ is the upper limit of the $P_{CMAX}$, and may be defined as shown in Equation 3.

$$P_{CMAX\_H} = \min\{P_{EMAX}, P_{PowerClass} - \Delta P_{PowerClass}\} \qquad \text{[Equation 3]}$$

In Equation 3, PEMAX is the maximum power value configured using higher layer signaling, PPowerClass is the maximum power value determined according to the power classes of the terminal in Table 15, and $\Delta P_{PowerClass}$ is an offset value of power changed according to various conditions such as power classes, operating bands, uplink duty cycle values of the terminal, and the like.

In Equation 2, the PCMAX_L is a lower limit of PCMAX, and may be defined as shown in Equation 4.

$$P_{CMAX\_L} = \min\{P_{EMAX} - \Delta T, (P_{PowerClass} - \Delta P_{PowerClass}) - \max\{MPR + A\_MPR + \Delta T, P\_MPR\}\} \qquad \text{[Equation 4]}$$

In Equation 4, PEMAX is the maximum power value configured using higher layer signaling, PPowerClass is the maximum power value determined according to the power classes of the terminal in Table 15, and $\Delta P_{PowerClass}$ is an offset value of power changed according to various conditions such as power classes, operating bands, uplink duty cycle values of the terminal, and the like. In addition, as shown in Table 16, $\Delta T$ is a tolerance value that varies depending on various situations, such as a tolerance according to the operating band, a tolerance according to SRS switching capability of the terminal, and the like. For MPR and A-MPR, reference is to be made to the description above.

In Equation 4, P-MPR is the maximum output power reduction value allowed for the following purposes.

Ensuring compliance with applicable electromagnetic energy absorption requirements and addressing unwanted emissions/self desense requirements in case of simultaneous transmissions on multiple RAT(s) for scenarios not in scope of 3GPP RAN specifications; and Ensuring compliance with applicable electromagnetic energy absorption requirements in case of proximity detection is used to address such requirements that require a lower maximum output power.

The P-MPR value may be different between serving cells (or component carriers). The terminal may report the maximum output power value, which is obtained by applying the P-MPR to the P-MPR, to the base station, and the base station may perform various operations such as scheduling determination, based on the same.

The P-MPR may largely help the terminal to satisfy the MPE regulations, but since the P-MPR limits the maximum output power, it may directly affect the performance of the uplink. For example, the P-MPR may have a value of approximately 3 dB in the FR1, but the P-MPR may increase to 10 dB or more in the FR2, thereby causing a problem with serious deterioration of the uplink coverage in the high frequency band.

Another method to satisfy the MPE regulations of the terminal may be to limit the uplink duty cycle below a specific value.

Figure 10:
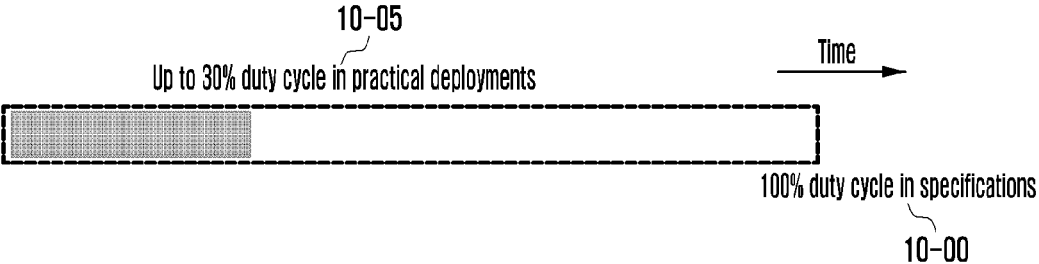
FIG. 10 illustrates a diagram of an example of restriction of uplink duty cycles.

FIG. 10 illustrates a diagram of an example of restriction of uplink duty cycles.

Referring to FIG. 10, although 100% of the uplink duty cycle is supported in the standard (i.e., even if uplink transmission is able to be performed without limitation), it may be predetermined (or restricted) that the uplink transmission corresponding to 30% or more of the maximum uplink available time is not performed by defining (or signaling) a maximum uplink duty cycle having a specific value (e.g., 30%). This means that the uplink transmission power of the terminal is used only by the limited specific value (%) relative to the maximum power density(S) (mW/cm2) measured using Equation 1 in the actual network. Therefore, the MPE regulations may be satisfied by configuring or predetermining an appropriate value. For example, in 3GPP, the values such as {2%, 10%, 20%, 25%, 30%, 40%, 50%, 60%, 70%, 80%, 90%, 100%} are being discussed as the maximum uplink duty cycle value. Meanwhile, since the method may deteriorate the uplink coverage for reasons similar to those for the P-MPR, additional equipment is required to satisfy the MPE regulations.

The following specific embodiments provide a signaling structure for satisfying the MPE regulations and the operation of a base station/terminal, based thereon.

First Embodiment

The first embodiment describes a method for satisfying the MPE regulations through UE-assisted or UE-triggered uplink transmission subset restriction (UL-TxSR).

The "subset" of the uplink transmission may mean a subset of at least one of UL codebooks, UL antenna ports, spatial relations, and DL/UL TCI states for uplink transmission.

The "spatial relation" indicates the spatial correlation or the correlation of beam direction between the reference RS/channel and the target RS/channel defined through L1/L2/L3 signaling. For example, in the case where the reference RS is configured (or indicated) using an CSI-RS and where the target RS is configured (or indicated) using an SRS, the terminal may transmit the SRS using the same beam as the beam used for receiving the CSI-RS.

If a specific condition (Condition 1) is satisfied, the terminal may notify the base station that UL-TxSR is required to be used. In other words, if Condition 1 is satisfied, the terminal may make a request to the base station for applying UL-TxSR.

One example of Condition 1 may be the terminal-user proximity or direction (beam) measured/predicted by a specific method (Method 1).

Figure 11:
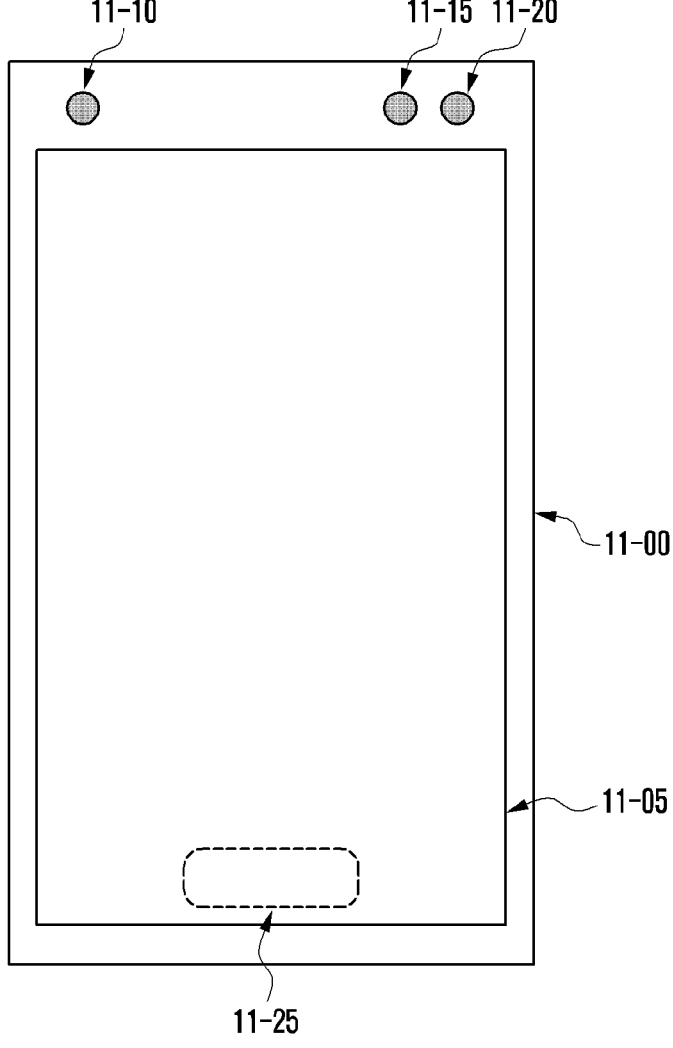
FIG. 11 illustrates a diagram of the configuration of a front part of a terminal according to an embodiment.

FIG. 11 is a diagram illustrating the configuration of a front part of a terminal according to an embodiment.

Referring to FIG. 11, a front part 11-00 of the terminal may be configured as various elements such as a display 11-05 for outputting images, an illuminance sensor 11-10 for measuring brightness, camera sensors or a sensor array 11-15 and 11-20 for obtaining security/personal information-related image information such as iris/face/normal images, and a radar-based sensor 11-25 for measuring fingerprint information or the distance to a nearby object. In this example, the terminal may measure the distance between the terminal and the user or a relative direction between the terminal and the user using at least one of the elements 11-05 to 11-25 of the front part 11-00 in the terminal. If the measured value falls within a predetermined specific range or is lower than a reference value so as to satisfy a specific condition, the terminal may make a request to the base station for applying UL-TxSR.

One example of Condition 1 may be the terminal-user proximity or direction (beam) measured/predicted by a specific method (Method 2).

Figure 12:
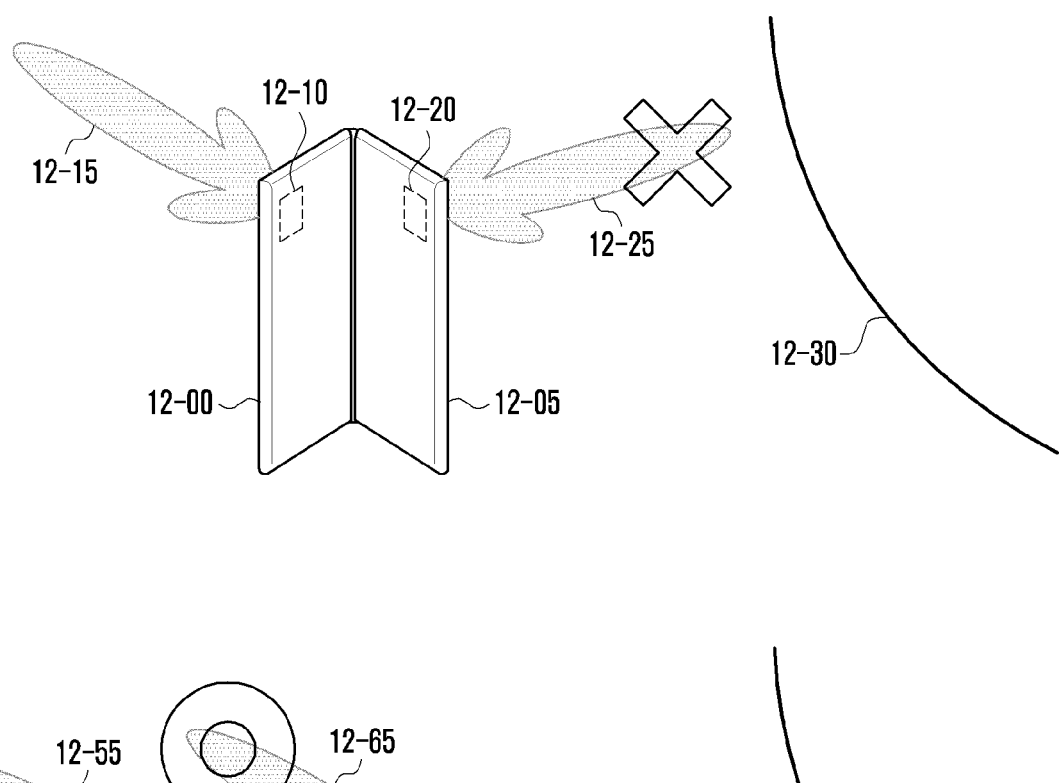
FIG. 12 illustrates a diagram of an example of a change in the shape of a terminal according to an embodiment.
Figure 12:
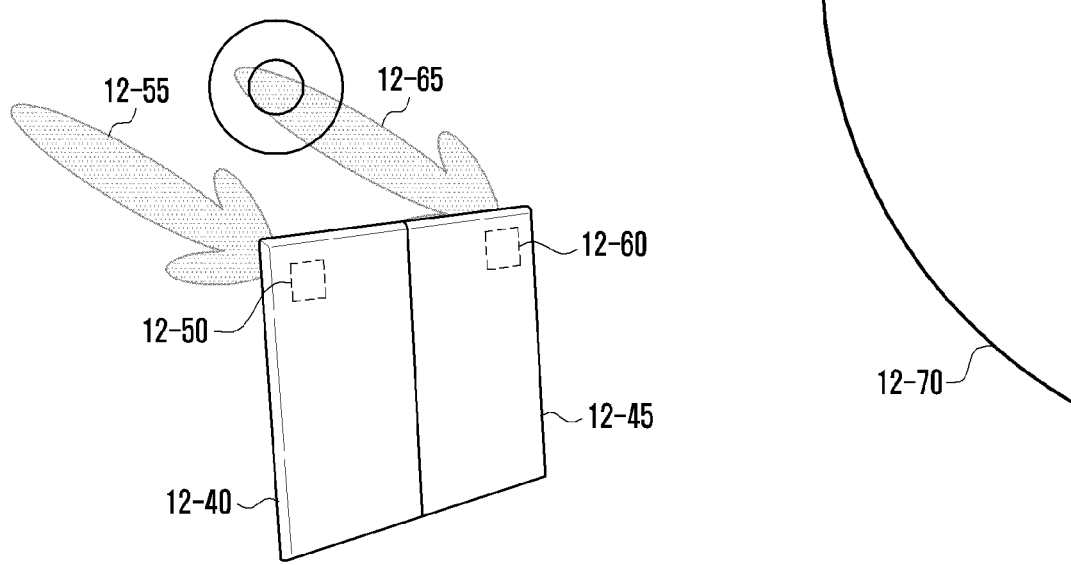

FIG. 12 is a diagram illustrating an example of a change in the shape of a terminal according to an embodiment.

Referring to FIG. 12, the terminal may include two or more parts 12-00 and 12-05 or 12-40 and 12-45, and the overall shape thereof may change according to the user's preference or the type of application executed. The shape of the terminal may change in various ways. For example, the terminal may change from a bent shape such as a combination of 12-00 and 12-05 to an unfolded shape such as a combination of 12-40 and 12-45, from a rounded shape to an unfolded shape, or the like. In the case where the respective parts 12-00, 12-05, 12-40, and 12-45 of the terminal have different antennas 12-10, 12-20, 12-50, and 12-60 (including antenna elements, antenna ports, antenna panels, etc.), the beam 12-15, 12-25, 12-55, and 12-65 emitted from the respective antennas may also change according to the change in the shape of the terminal.

In this case, if the human body 12-30 and 12-70 are located at a specific distance and in a specific direction relative to the terminal, the beam emitted from a specific antenna 12-20 in the direction 12-25 may radiate high power radio waves to the human body 12-30 in a specific shape (a combination of 12-00 and 12-05), thereby failing to satisfy the MPE regulations. On the other hand, in another shape (a combination of 12-40 and 12-45), the direction 12-65 of the beam emitted from the antenna 12-60 changes such that high power radio waves are no longer emitted to the human body 12-70, and is thus suitable for uplink transmission. In this example, the terminal may determine the shape of the terminal, and if a predetermined condition is satisfied, for example, if the angle or distance between the elements of the terminal is less than a specific value or falls within a specific range, the terminal may make a request to the base station for applying UL-TxSR.

The request for application of UL-TxSR may be configured as a single bit, or may be simply configured to distinguish a request according to presence or absence of the uplink transmission using a specific resource. Furthermore, the request for application of UL-TxSR may include information on the uplink transmission subset that is not preferred by the terminal. For example, in order to satisfy MPE regulations when requesting UL-TxSR, the terminal may report indexes such as SRS resources or SRS resource sets, which are not preferred at the point in time, or may report indexes such as CSI-RS resources or the CSI-RS resource sets, which are not preferred, based on the spatial relation.

When the methods according to the first embodiment are applied, the terminal is required to store information related to the uplink transmission subset, such as the uplink beam shape or direction, in a storage device of the terminal.

Figure 13:
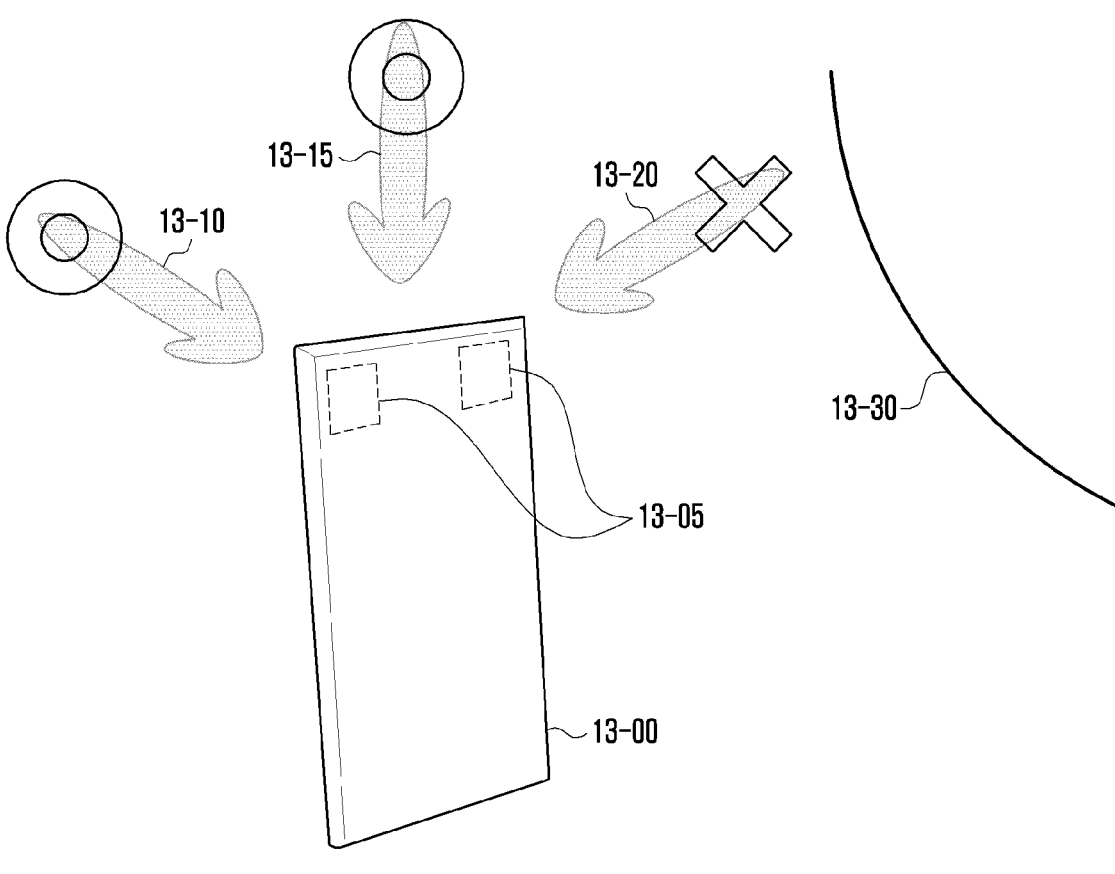
FIG. 13 illustrates a diagram of an example of managing uplink beam shape information of a terminal according to an embodiment.

FIG. 13 is a diagram illustrating an example of managing uplink beam shape information of a terminal according to an embodiment.

Referring to FIG. 13, the terminal 13-00 may transmit one or more beams 13-10, 13-15, and 13-20 through antennas 13-05 (including antenna elements, antenna ports, or antenna panels), and in the conventional system, the terminal is not required to store exact information on the direction of the beams because it is managed at the reception end by the base station. However, in terms of satisfying MPE regulations, it is difficult for the base station to obtain the information on the harmfulness of the respective beam 13-10, 13-15, and 13-20 to the human body 13-30. Accordingly, the terminal 13-00 must recognize in advance the satisfaction or unsatisfaction of MPE regulations depending on the direction of each possible uplink transmission subset (or each uplink transmission beam) according to the location and direction information 13-05 of the antennas in the terminal, and must store the preferences (for example, whether or not the uplink transmission subset is able to be used if additional restrictions are required to be applied in order to satisfy MPE regulations) in a memory.

As another example of the embodiment, after receiving the request for UL-TxSR from the terminal, the base station may provide signaling for accepting the request. Based on this, the terminal may perform necessary operations such as power backoff for each uplink transmission subset (or each uplink transmission beam), a CSI adjustment (for example, reporting a lower CQI related to the corresponding uplink transmission), or the like, and the base station may also receive uplink transmission data in consideration of the same.

As another example of the embodiment, after receiving the request for UL-TxSR from the terminal, the base station may provide signaling for accepting the request. The base station and the terminal may understand that the existing uplink beam-related information is outdated, and may perform operations for re-configuring or re-establishing new uplink beam information. For example, when a specific period of time elapses after requesting UL-TxSR, or when a specific period of time elapses after receiving a permission for the request of UL-TxSR, the terminal may appropriately adjust the transmission power for the uplink beam direction or each uplink transmission subset. This means that the base station is required to perform necessary operations, such as tracking an uplink beam through an aperiodic SRS request, an aperiodic CSI-RS request, or the like, in order to obtain new uplink transmission information of the terminal, after the corresponding condition is satisfied (i.e., if a specific period of time elapses after requesting UL-TxSR, or if a specific period of time elapses after receiving a permission for the request of UL-TxSR).

Figure 14:
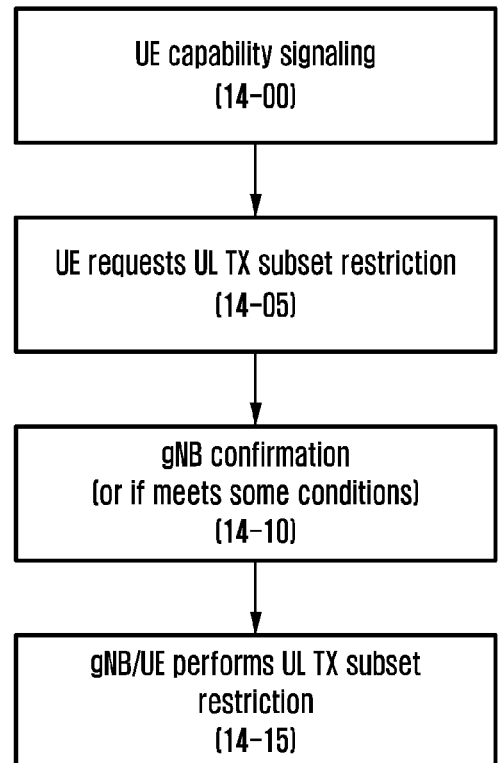
FIG. 14 illustrates a flowchart of the operation of a base station and a terminal for UL-TxSR according to an embodiment.

FIG. 14 illustrates a flowchart of the operation of a base station and a terminal for UL-TxSR according to an embodiment. Referring to FIG. 14, the terminal performs reporting of terminal capability on UL-TxSR (14-00). A request for UL-TxSR may be performed only by the terminal that has performed the capability reporting according to one of the above-described examples (14-05). The base station may receive and approve the request (14-10). This step may be omitted if there is a predetermined specific condition as described in the above examples (14-10). Based on the approval of the base station or according to whether or not a predetermined specific condition is satisfied, the base station and the terminal perform UL-TxSR according to one of the above examples (14-15).

Second Embodiment

In a second embodiment, a method of satisfying MPE regulations, based on the beam group configuration, will be described.

For detailed conditions necessary for applying the second embodiment, reference is to be made to the description of the first embodiment.

Figure 15:
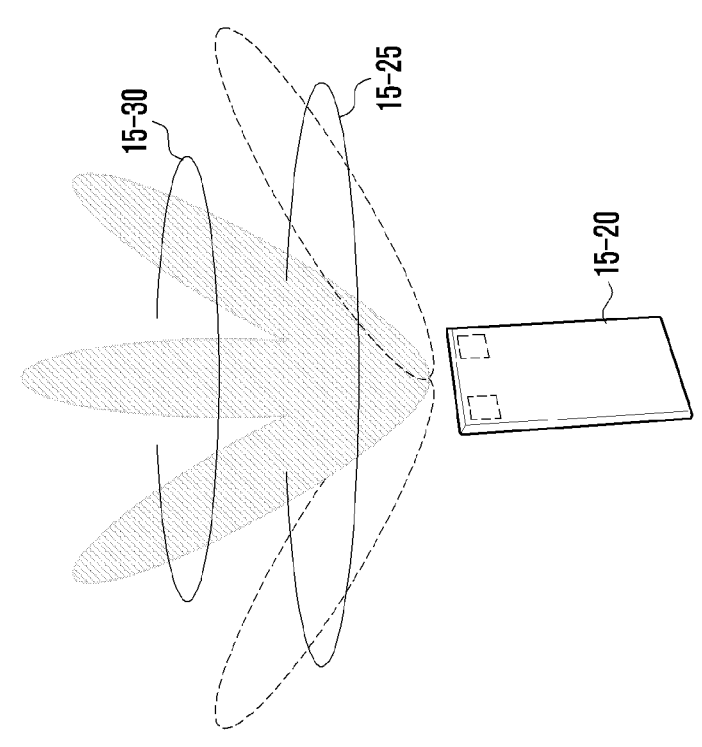
FIG. 15 illustrates a diagram of a method for satisfying MPE regulations through uplink beam group indication according to an embodiment.
Figure 15:
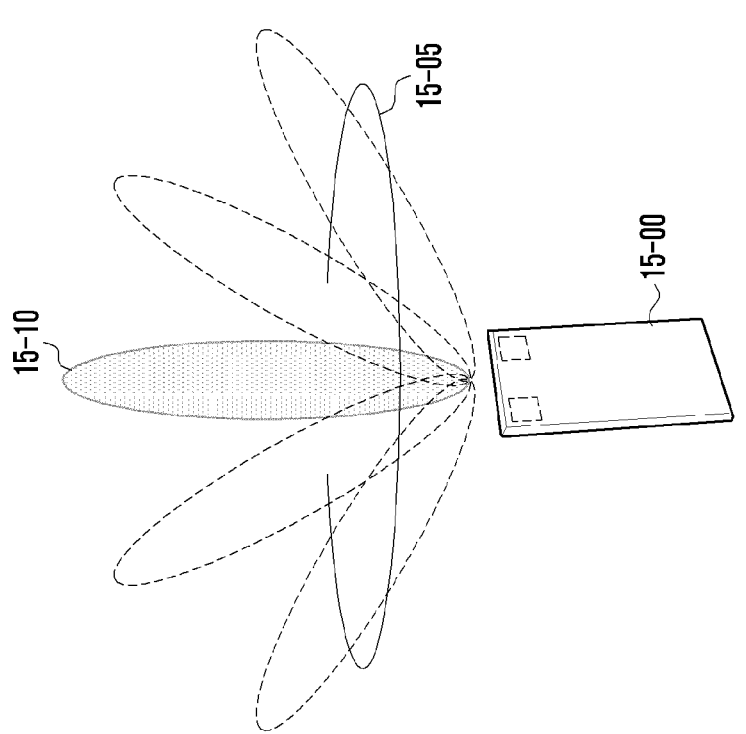

FIG. 15 illustrates a diagram of a method for satisfying MPE regulations through indication of an uplink beam group according to an embodiment.

Although an example in FIG. 15 is able to be applied to various uplink reference signals and channels such as PUSCHs, PUCCHs, PUSCHs, or PUCCHs DMRSs, SRSs, PRACHs, and the like, hereinafter, a description will be made based on the SRS for convenience. That is, the SRS in the following description may be replaced with a PUSCH, a PUCCH, a PUSCH, or a PUCCH DMRS, an SRS, a PRACH, or the like to perform a similar operation.

Referring to FIG. 15, the terminal may perform one of the two operations below according to a higher layer or L1 signaling indicating beam group-based uplink transmission.

Operation 1: The terminal may select one of a plurality of possible uplink beam directions according to an indication of the base station, may apply the same to the SRS transmission, and may then apply power control for the selected SRS transmission.

Operation 2: The terminal may select a subset including two or more of a plurality of possible uplink beam directions according to an indication of the base station, may apply the same to one or more SRS transmissions, and may then apply power control for the selected SRS transmissions. In this case, the terminal may adjust (lower) each SRS transmission power in the beam subset in consideration of MPE regulations, and at least one SRS in one subset must be ensured to follow conventional power control.

Explaining Operation 1 in detail, the terminal 15-00 receives a configuration of a plurality of SRS resources (or SRS resource sets) through higher layer signaling (15-05), and transmits one of the SRS resources (or SRS resource sets) at a time predetermined according to the higher layer configuration, or transmits an SRS resource (or an SRS resource set) indicated by an SRS resource indicator (SRI) (15-10). If it is configured or indicated that one or more SRSs are to be transmitted at a time (OFDM symbol), the terminal may transmit one SRS having the highest priority according to the priority of the respective SRSs. The terminal performs SRS power control for the SRS 15-10 transmitted at a time (OFDM symbol) using Equation 5. Equation 5 should be modified to conform to the type of uplink reference signal or channel to which the example is applied, but the listing of all possible uplink power controls will be omitted in order to not obscure the subject matter of the description.

[Equation 5]

$$P_{SRS,b,f,c}(i, q_s, l) =$$

$$\min \left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\} (\text{dBm})$$

In Equation 5, "b" is an uplink bandwidth part index, "f" is a carrier index in the serving cell "c", "1" is an SRS power control adjustment state index, and "i" is an SRS transmission occasion. Refer to Table 20 below for a description of other variables in Equation 5.

TABLE 20

| |
|---|
| -    $P_{CMAX, f,c}(i)$ is the configured UE transmit power defined in [8, TS 38.101-1] and [8-2, TS38.101-2] for carrier f of serving cell c in SRS transmission occasion i |
| -    $P_{0\_SRS,b,f,c}(s)$ is provided by p0 for active UL BWP b of carrier f of serving cell c and SRS resource set $q_s$ provided by SRS-ResourceSet and SRS-ResourceSetId; if p0 is not provided, $P_{0\_SRS,b,f,c}(q_s) = P_{0\_NOMINAL\_PUSCH,f,c}(0)$ |
| -    $M_{SRS,b,f,c}(i)$ is a SRS bandwidth expressed in number of resource blocks for SRS transmission occasion i on active UL BWP b of carrier f of serving cell c and μ is a SCS configuration defined in [4, TS 38.211] |
| -    $\alpha_{SRS,b,f,c}(q_s)$ is provided by alpha for active UL BWP b of carrier f of serving cell c and SRS resource set $q_s$ |
| -    $PL_{b,f,c}(q_d)$ is a downlink pathloss estimate in dB calculated by the UE using RS resource index $q_d$ as described in Subclause 7.1.1 for the active DL BWP of serving cell c and SRS resource set $q_s$ [6, TS 38.214]. The RS resource index $q_d$ is provided by pathlossReferenceRS associated with the SRS resource set $q_s$ and is either a ssb-Index providing a SS/PBCH block index or a csi-RS-Index providing a CSI-RS resource index |
| -    If the UE is not provided pathlossReferenceRS or before the UE is provided dedicated higher layer parameters, the UE calculates $PL_{b,f,c}(q_d)$ using a RS resource obtained from the SS/PBCH block that the UE uses to obtain MIB |
| -    If the UE is provided pathlossReferenceLinking, the RS resource is on a serving cell indicated by a value of pathlossReferenceLinking |

TABLE 20-continued

- For the SRS power control adjustment state for active UL BWP b of carrier f of serving cell c and
  SRS transmission occasion i
- $h_{b,f,c}(i, l) = h_{b,f,c}(i, l)$, where $f_{b,f,c}(i, l)$ is the current PUSCH power control adjustment state as
  described in Subclause 7.1.1, if srs-PowerControlAdjustmentStates indicates a same power control
  adjustment state for SRS transmissions and PUSCH transmissions; or

- $$h_{b,f,c}(i) = h_{b,f,c}(i-1) + \sum_{m=0}^{C(S_i)-1} \delta_{SRS,b,f,c}(m) \quad \text{if the UE is not configured for PUSCH transmissions}$$

on active UL BWP b of carrier f of serving cell c, or if srs-PowerControlAdjustmentStates
  indicates separate power control adjustment states between SRS transmissions and PUSCH
  transmissions, and if tpc-Accumulation is not provided, where
  - The $\delta_{SRS,b,f,c}$ values are given in Table 7.1.1-1

Explaining Operation 2 in detail, the terminal 15-20 receives a configuration of a plurality of SRS resources (or SRS resource sets) through higher layer signaling (15-25), and transmits the subsets including two or more of the SRS resources at a time predetermined according to the higher layer configuration, or transmits the SRS resources indicated by an SRS resource indicator (SRI) (i.e., the subsets including two or more of the SRS resources) (15-30). The terminal performs SRS power control on the transmitted SRS group 15-30 using Equation 5.

Equation 5 should be modified to conform to the type of uplink reference signal or channel to which the example is applied, but the listing of all possible uplink power controls will be omitted in order to not obscure the subject matter of the description. In this case, the terminal is capable of adjusting (lowering) each SRS transmission power in the beam subset in consideration of MPE regulations, and at least one SRS in one subset must be ensured to follow conventional power control.

Third Embodiment

In a third embodiment, a method of satisfying MPE regulations, based on P-MPR or UL duty cycle configuration for each terminal panel, will be described.

For detailed conditions necessary for applying the third embodiment, reference is to be made to the description of the first embodiment.

In Equation 4, the P-MPR may be configured for each panel p of the terminal used in the carrier "f" of the serving cell "c", extending from being configured for each carrier "f" of the serving cell "c". For example, in the case where a terminal having one carrier configured in one serving cell has a total of four panels p € {0, 1, 2, 3}, four different P-MRPs are able to be applied. In addition, the terminal may report, to the base station, information on whether or not different P-MPRs are applied to the respective panels or information about different P-MPR values between the respective panels.

Similarly, in Equation 4, the P-MPR may be configured for each beam or beam group "p" used in the carrier "f" of the serving cell "c", extending from being configured for each carrier "f" of the serving cell "c". For example, in the case where a terminal having one carrier configured in one serving cell has a total of 16 beams p E {0, 1, 2, . . . , 15}, 16 different P-MRPs are able to be applied thereto. The example may be applied to a beam group including one or more beams in a similar manner. In addition, the terminal may report, to the base station, information on whether or not different P-MPRs are applied to the respective beams or beam groups, or information about different P-MPR values between the respective beams or beam groups.

An extension similar thereto may be applied to the maximum UL duty cycle. For example, the maximum UL duty cycle may be configured for each panel "p" of the terminal, extending from being configured for each terminal. For example, if the terminal has a total of four panels p∈ {0, 1, 2, 3}, four different maximum UL duty cycles are able to be applied thereto. The above example may be applied to a beam group including one or more beams in a similar manner. In this case, information on whether or not different maximum UL duty cycles are applied to the respective panels and information about different maximum UL duty cycle values between the respective panels may be transmitted to the terminal through higher layer signaling.

As another example of the extension of the maximum UL duty cycle, the maximum UL duty cycle may be configured for each uplink beam or beam group "p", extending from being configured for each terminal. For example, if the terminal has a total of 16 beams p∈ {0, 1, 2, . . . , 15}, 16 different maximum UL duty cycles are able to be applied thereto. In this case, information on whether or not different maximum UL duty cycles are applied to the respective beams or beam groups and information about different maximum UL duty cycle values between the respective beams or beam groups may be transmitted to the terminal through higher layer signaling.

Fourth Embodiment

A fourth embodiment describes a method of satisfying MPE regulations, based on implementation of a terminal.

For detailed conditions necessary for applying the fourth embodiment, reference is to be made to the description of the first embodiment.

According to the fourth embodiment, similarly to the above description, if the terminal-user distance or direction satisfies a specific condition, the terminal selects downlink reference signals or channels associated with the uplink reference signals or channels that may have problems in relation MPE regulations. Thereafter, the terminal may perform operations related to MPE regulations when producing CSI related to the selected downlink reference signals or channels (for example, L1-RSRP, CQI, or the like). The operation related to MPE regulations may be variously performed in such a manner that "a beam failure recovery request is performed for a corresponding downlink reference signal", "the SNR for a corresponding CSI report is assumed to be lower by more than X dB from a measured value", "a corresponding CSI report is not included in a best-X report", or the like.

Figure 16:
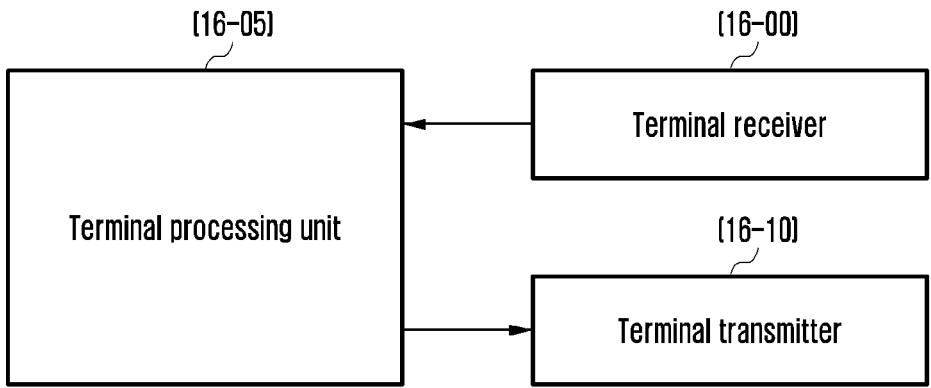
FIG. 16 illustrates a diagram of the structure of a terminal in a wireless communication system according to an embodiment.

FIG. 16 illustrates a block diagram of the structure of a terminal in a wireless communication system according to an embodiment.

Referring to FIG. 16, a terminal may be configured to include a transceiver 16-00 and 16-10, and a processing unit 16-05 including a memory and a processor. The transceiver 16-00 and 16-10 and the processing unit 16-05 of the terminal may operate according to the communication method of the terminal as described above. However, the elements of the terminal are not limited to the above-described examples. For example, the terminal may include more elements or fewer elements than the aforementioned elements. In addition, the transceiver 16-00 and 16-10 and the processing unit 16-05 may be implemented in a single chip.

The transceiver 16-00 and 16-10 may transmit and receive signals to and from a base station. The signal may include control information and data. To this end, the transceiver 16-00 and 16-10 may be configured to include an RF transmitter for up-converting and amplifying the frequency of a transmitted signal, and an RF receiver for low-noise-amplifying a received signal and down-converting the frequency thereof. However, this is only an example of the transceiver 16-00 and 16-10, and the elements of the transceiver 16-00 and 16-10 are not limited to the RF transmitter and the RF receiver.

In addition, the transceiver 16-00 and 16-10 may receive a signal through a wireless channel, may output the signal to the processing unit 16-05, and may transmit a signal output from the processing unit 16-05 through a wireless channel.

The processing unit 16-05 may store programs and data necessary for the operation of the terminal. In addition, the processing unit 16-05 may store control information or data included in the signal obtained from the terminal. The processing unit 16-05 may include a memory configured as a storage medium, such as ROM, RAM, a hard disk, CD-ROM, and a DVD, or a combination thereof.

In addition, the processing unit 16-05 may control a series of processes such that the terminal may operate according to the above-described embodiment. According to some embodiments, the processing unit 16-05 may control the elements of the terminal so as to perform uplink transmission satisfying MPE regulations.

Figure 17:
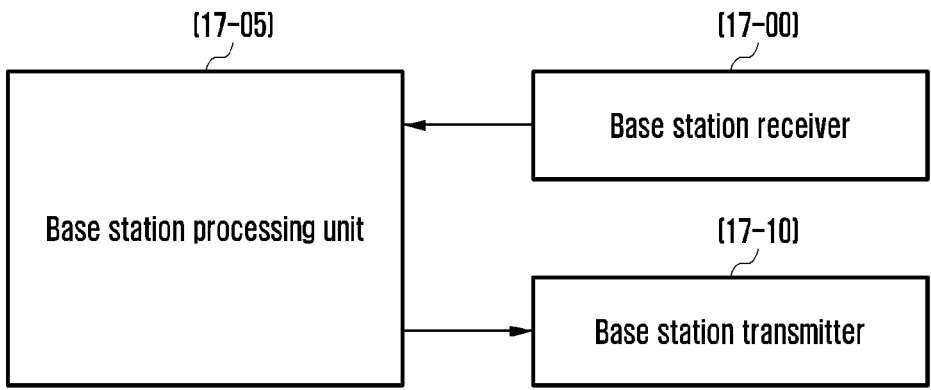
FIG. 17 illustrates a diagram of the structure of a base station in a wireless communication system according to an embodiment.

FIG. 17 illustrates a block diagram of the structure of a base station in a wireless communication system according to an embodiment.

Referring to FIG. 17, a base station may be configured to include a transceiver 17-00 and 17-10, and a processing unit 17-05 including a memory and a processor. The transceiver 17-00 and 17-10 and the processing unit 17-05 of the base station may operate according to the communication method of the base station as described above. However, the elements of the base station are not limited to the above-described examples. For example, the base station may include more elements or fewer elements than the aforementioned elements. In addition, the transceiver 17-00 and 17-10 and the processing unit 17-05 may be implemented in a single chip.

The transceiver 17-00 and 17-10 may transmit and receive signals to and from a terminal. The signal may include control information and data. To this end, the transceiver 17-00 and 17-10 may be configured to include an RF transmitter for up-converting and amplifying the frequency of a transmitted signal, and an RF receiver for low-noise-amplifying a received signal and down-converting the frequency thereof. However, this is only an example of the transceiver 17-00 and 17-10, and the elements of the transceiver 17-00 and 17-10 are not limited to the RF transmitter and the RF receiver.

In addition, the transceiver 17-00 and 17-10 may receive a signal through a wireless channel, may output the signal to the processing unit 17-05, and may transmit a signal output from the processing unit 17-05 through a wireless channel.

The processing unit 17-05 may store programs and data necessary for the operation of the base station. In addition, the processing unit 17-05 may store control information or data included in the signal obtained from the base station. The processing unit 17-05 may include a memory configured as a storage medium, such as ROM, RAM, a hard disk, CD-ROM, and a DVD, or a combination thereof.

The processing unit 17-05 may control a series of processes such that the base station may operate according to the above-described embodiment. According to some embodiments, the processing unit 17-05, may control the elements of the base station so as to perform uplink transmission satisfying MPE regulations.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary. For example, an embodiment and any other embodiment of the disclosure may be partially combined to operate a base station and a terminal. As an example, the first embodiment and the second embodiment of the disclosure may be partially combined to operate a base station and a terminal. Further, although the above embodiments have been described by way of the FDD LTE system, other variants based on the technical idea of the embodiments may be implemented in other systems such as TDD LTE, 5G, and NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A user equipment (UE) in a communication system, the UE comprising:

a transceiver; and a controller operably coupled to the transceiver, the controller configured to:

identify a number of power management maximum power reduction (P-MPR) values configured to be reported for a serving cell, wherein the P-MPR values are associated with maximum output power of the UE and the P-MPR values are applied to meet a maximum permissible exposure (MPE) requirement; and transmit, to a base station, a report including one or more P-MPR values for the serving cell, wherein the report includes a plurality of P-MPR values for the serving cell in case that the plurality of P-MPR values is configured to be reported for the serving cell.

2. The UE of claim 1, wherein each of the plurality of P-MPR values corresponds to each of a plurality of beams.

3. The UE of claim 1, wherein a maximum number of P-MPR values configured to be reported for the serving cell is 4.

4. The UE of claim 1, wherein the serving cell operates on a frequency range 2 (FR2).

5. A base station in a communication system, the base station comprising:

a transceiver; and a controller operably coupled to the transceiver, the controller configured to:

identify a number of power management maximum power reduction (P-MPR) values configured to be reported for a serving cell, wherein the P-MPR values are associated with maximum output power of a user equipment (UE) and the P-MPR values are applied to meet a maximum permissible exposure (MPE) requirement; and receive, from the UE, a report including one or more P-MPR values for the serving cell, wherein the report includes a plurality of P-MPR values for the serving cell in case that the plurality of P-MPR values is configured to be reported for the serving cell.

6. The base station of claim 5, wherein each of the plurality of P-MPR values corresponds to each of a plurality of beams.

7. The base station of claim 5, wherein a maximum number of P-MPR values configured to be reported for the serving cell is 4.

8. The base station of claim 5, wherein the serving cell operates on a frequency range 2 (FR2).

9. A method performed by a user equipment (UE) in a communication system, the method comprising:

identifying a number of power management maximum power reduction (P-MPR) values to be reported for a serving cell, wherein the P-MPR values are associated with maximum output power of the UE and the P-MPR values are applied to meet a maximum permissible exposure (MPE) requirement; and transmitting, to a base station, a report including one or more P-MPR values, wherein the report includes a plurality of P-MPR values for the serving cell in case that the plurality of P-MPR values is configured to be reported for the serving cell.

10. The method of claim 9, wherein each of the plurality of P-MPR values corresponds to each of a plurality of beams.

11. The method of claim 9, wherein a maximum number of P-MPR values configured to be reported for the serving cell is 4.

12. The method of claim 9, wherein the serving cell operates on a frequency range 2 (FR2).

13. A method performed by a base station in a communication system, the method comprising:

identifying a number of power management maximum power reduction (P-MPR) values to be reported for a serving cell, wherein the P-MPR values are associated with maximum output power of a user equipment (UE) and the P-MPR values are applied to meet a maximum permissible exposure (MPE) requirement; and receiving, from a user equipment (UE), a report including one or more P-MPR values, wherein the report includes a plurality of P-MPR values for the serving cell in case that the plurality of P-MPR values is configured to be reported for the serving cell.

14. The method of claim 13, wherein each of the plurality of P-MPR values corresponds to each of a plurality of beams.

15. The method of claim 13, wherein a maximum number of P-MPR values configured to be reported for the serving cell is 4.

16. The method of claim 13, wherein the serving cell operates on a frequency range 2 (FR2).

* * * * *